(12) United States Patent
Hastings et al.

(10) Patent No.: US 12,044,210 B2
(45) Date of Patent: Jul. 23, 2024

(54) JETSTREAM POWER GENERATING SYSTEM

(71) Applicants: Gregory Howard Hastings, Bremerton, WA (US); David John Hartshorne, Bury St. Edmonds (GB); John Ross Allen, Naples, FL (US); Dale Richard Gluck, Berwyn, PA (US)

(72) Inventors: Gregory Howard Hastings, Bremerton, WA (US); David John Hartshorne, Bury St. Edmonds (GB); John Ross Allen, Naples, FL (US); Dale Richard Gluck, Berwyn, PA (US)

(*) Notice: Subject to any disclaimer, the term of this patent is extended or adjusted under 35 U.S.C. 154(b) by 0 days.

(21) Appl. No.: 18/493,179

(22) Filed: Oct. 24, 2023

(65) Prior Publication Data
US 2024/0141867 A1    May 2, 2024

Related U.S. Application Data

(60) Provisional application No. 63/380,959, filed on Oct. 26, 2022.

(51) Int. Cl.
*F03D 5/00* (2006.01)
*F03D 7/00* (2006.01)
(Continued)

(52) U.S. Cl.
CPC ............ *F03D 5/015* (2023.08); *F03D 7/051* (2023.08); *F03D 15/101* (2023.08); *F03D 15/202* (2023.08)

(58) Field of Classification Search
CPC ...... F03D 5/015; F03D 15/101; F03D 15/202; F03D 7/051
See application file for complete search history.

(56) References Cited

U.S. PATENT DOCUMENTS

| 4,084,102 A | 4/1978 | Fry |
| 9,046,072 B2 | 6/2015 | Tattersfield |

(Continued)

OTHER PUBLICATIONS

International Search Report and Written Opinion issued in App. No. PCT/US23/77613, mailing date Feb. 28, 2024, 7 pages.

*Primary Examiner* — Viet P Nguyen
(74) *Attorney, Agent, or Firm* — Blueshift IP; Robert Plotkin

(57) ABSTRACT

The present disclosure relates to and envisages a jetstream power generating system. Producing electric power from jetstream force presents specific, daunting, physics-based challenges, because jetstream forces are 30 to 50 times stronger than wind on the ground. The system is configured to harness the energy of these jetstream forces in farms as power generating infrastructure. The system comprises an airborne element configured to be subjected to lift forces while flying in a jetstream, a capstan drum, a tether coupled between the airborne element and the capstan drum, an arcuate guide track, a kite tracker displaceably mounted on the guide track, a conversion unit coupled to the capstan drum, a plurality of accumulators configured to fluidly communicate with the conversion unit, and a generator. The kite tracker is configured to securely guide the tether to rotate the capstan drum in a first direction with a force equivalent to the lift force to facilitate payout of said tether, and to rotate said capstan drum in a second direction when said tether is reeled in. The conversion unit is configured to be driven by the capstan drum, when the capstan drum is rotated in the first direction, to pressurize hydraulic fluid passing there through. Each accumulator is configured to receive, store and release the pressurized hydraulic fluid therein. The generator is configured to receive the pressurized hydraulic fluid to facilitate generation of electric power.

17 Claims, 15 Drawing Sheets

(51) Int. Cl.
  *F03D 15/00*     (2016.01)
  *F03D 15/10*     (2016.01)

(56) References Cited

U.S. PATENT DOCUMENTS

| | | |
|---|---|---|
| 2010/0026007 A1 | 2/2010 | Bevirt |
| 2013/0285377 A1 | 10/2013 | Tattersfield |
| 2015/0153741 A1 | 6/2015 | North |
| 2015/0308411 A1* | 10/2015 | Goldstein ............... F03D 15/10 |
| | | 290/55 |
| 2020/0080541 A1* | 3/2020 | Bourgault ............. F04B 1/0421 |

* cited by examiner

Approximate Tether to Kite Tracker Angles Due to Catenary Effect

Example of Forces Acting on Kite-Tracker Vertical Sheave

Example of Forces Acting on Kite-Tracker Vertical Sheave

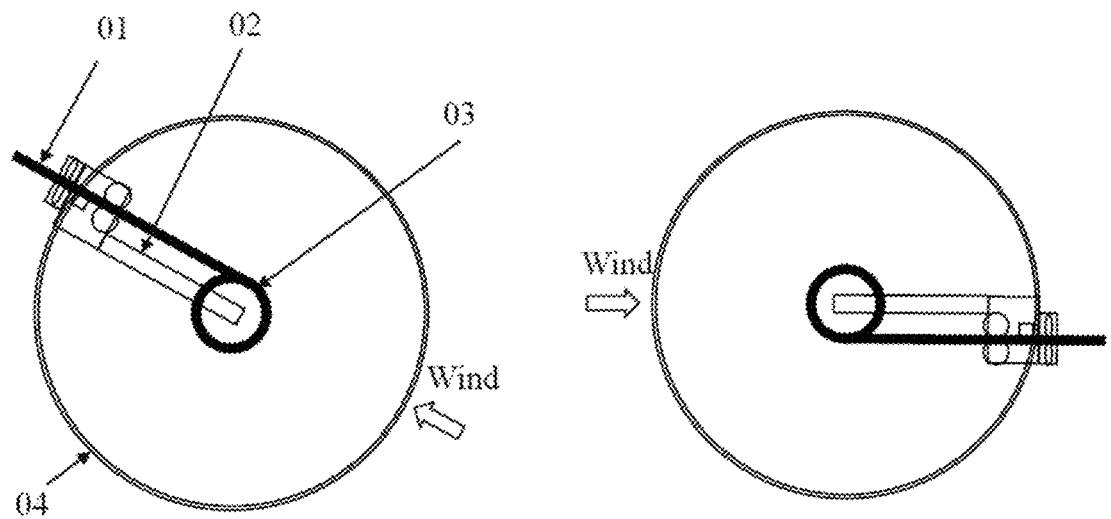
FIGURE 15A
FIGURE 15B
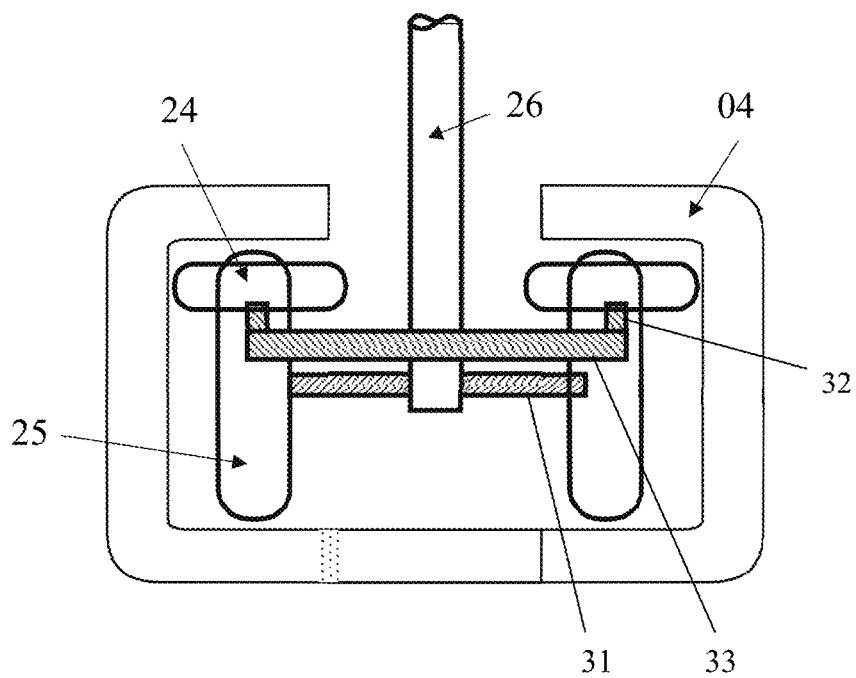
FIGURE 16

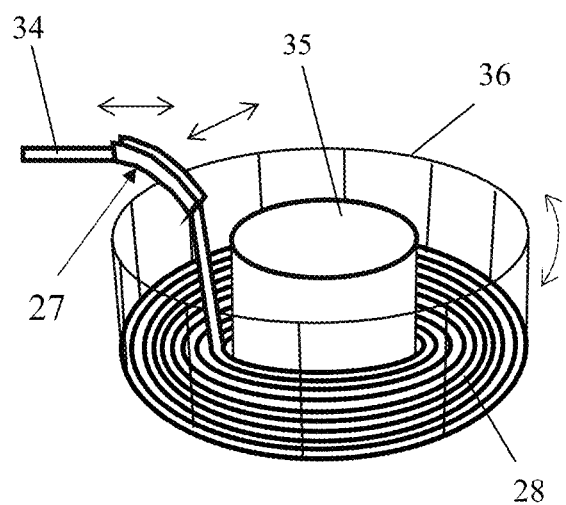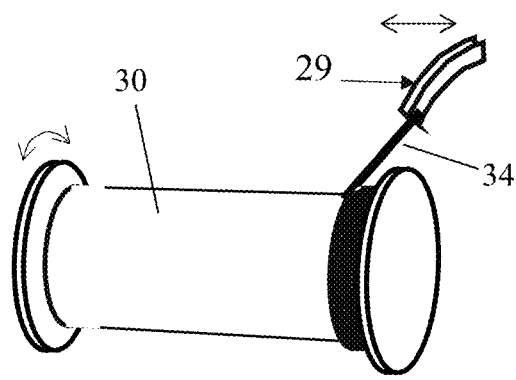
FIGURE 17A                    FIGURE 17B

JETSTREAM POWER GENERATING SYSTEM

FIELD

The present disclosure generally relates to power generating systems, specifically to jetstream power generating systems.

BACKGROUND

The background information herein relates to the present disclosure but is not necessarily prior art.

Renewable power generating systems, such as photovoltaic panels and tower-based wind turbines, yield sustainable, non-fossil-fueled electricity from naturally occurring energy sources, including sunlight and terrestrial, near-ground-level wind. Now consider that seasonal jetstream force (nominally 10,000 meters/30,000 feet altitude) is a next primary source of sustainable natural energy for the purpose of power generation. Because it is impractical to access airspace for individual systems one-at-a-time, and to be useful jetstream power generation requires a complex and elaborate infrastructure, which this disclosure anticipates. Scale and speed are paramount to address the interdependent crises of energy supply and climate. Global needs for additional sustainable, non-thermal, non-polluting electrical power are usefully measured in thousands of terawatt hours of output per year.

Producing such electric power presents specific, daunting physics-based challenges, because jetstream forces are 30 to 50 times stronger than wind on the ground. These challenges require solving a series of distinct problems, e.g., accessibility; safety; transmission of kinetic energy to the ground; the magnitude and dynamic range of forces; transforming the resulting power into smooth, uniform, continuous electricity; and making electric power generation from jetstream force a quantified, practical, and commercially practical advent, while maintaining a net positive energy balance. Once such a mechanism is available, all may anticipate its commercial application and value. Qualities of consistent, factory manufactured generating systems become advantages, relying upon historically proven components and widely available, non-precious materials, all in contrast to the site-specific, bespoke engineered power generating plants that burn fossil fuels. Further, ancillary applications of this disclosure include using the resulting energy farms to time shift electricity produced by other methods, e.g., photovoltaic solar—constituting grid-scale, counter-seasonal hydraulic storage, in lieu of chemical batteries. Proposed methods thus far consist of tethered aircraft configured to capture seasonal jetstream energy (force). A key priority is to safely generate power on the ground level, because it is a wholly impractical method to fly generators attached to conductive tether. The tethered crafts are typically kites that can fly within the altitude range of the jetstream. Further, relaying jetstream force via pull (force and displacement) of the tether results in a highly discontinuous power output, with long alternating time periods of power generation and power consumption, as well as large power fluctuations during the power generation period. Such discontinuity is contraindicated for electrical generators that are designed to perform best at constant speeds, and such uneven power output is unsuited to user needs.

Further, the tethered craft forms a very large tensile structure that is controlled by the ground station. However, if the tether tension drops below threshold level, it will be impossible to maintain the integrity of the tensile structure, which would result in loss of control over the craft. On the other hand, if the tether tension exceeds the threshold level, the structure is at risk of failure. Another form of structural risk connects management of tether tension to durability, i.e., extreme weather conditions may lead to wear and tear of the structure, apparatus and tether, thereby reducing the tensile strength and risking collapse or failure of the structure. Thus, dynamic impedance matching across the major components of jetstream power generation is necessary and valuable.

Also, the conventional electro-mechanical apparatus used in power generation from other energy sources, such as a horizontal-axis wind turbine transmission and generator, is not capable to make necessary adjustments to the load impedance that jetstream power requires, nor can it supply the power required for tether retrieval.

Also, the conventional power distribution network is not capable of making necessary adjustments to the load impedance that jetstream power requires, nor can it supply the power required for tether retrieval.

Also, the arrival of a practical means to harness jetstream force for power generation makes it possible to quantify inputs and outputs, including ranges of energy density per unit of surface area, for a given location and seasonality. Such calculations enable comparisons for informed consideration of adoption and deployment of this advent. Useful comparisons include: geographic differences; economic, ecological and societal benefits; cost, risks and valuation of jetstream power generation systems, supply chains and deployed infrastructure; and economic advantages versus other power generation sources and methods, and lifecycle costs and benefits.

There is, therefore, need for a system to utilize the jetstream efficiently for the generation of power, and that alleviates the aforementioned impediments.

Definitions

The following energy transformation definitions are used to describe the present disclosure. There are only nine forms of energy (eight of those invoked in this disclosure, sans chemical). Any generating system must acknowledge this reality and address the transformation coefficients.

TABLE 1

| Diagnosing Performance and Reliability, Hartshorne, David J, 2021 | | | | |
|---|---|---|---|---|
| Domain | effort (e) | flow (f) | momentum (p) | displacement (q) |
| Electrical | electromotive force [V] | current [A] | flux $[V \cdot s]$ or [Wb] | charge $[A \cdot s]$ or [C] |
| Magnetic | magnetomotive force [A] | flux change rate $[Wb \cdot s^{-1}]$ | not applicable | flux $[V \cdot s]$ or [Wb] |
| Translational | force. [N] | velocity $[ms^{-1}]$ | momentum $[N \cdot s]$ | displacement [m] |

TABLE 1-continued

Diagnosing Performance and Reliability, Hartshorne, David J, 2021

| Domain | effort (e) | flow (f) | momentum (p) | displacement (q) |
|---|---|---|---|---|
| Rotational | torque [N · m] | angular velocity [rad s$^{-1}$] | angular momentum [N · m · s] | angle [rad] |
| Hydraulic | pressure [N · m$^{-2}$] | volumetric flow [m$^3$ · s$^{-1}$] | pressure momentum [N · m$^{-2}$ · s] | volume [m$^3$] |
| Compressible Fluid | specific enthalpy [J · kg$^{-1}$] | mass flow rate [kg · s$^{-1}$] | not applicable | mass [kg] |
| Interfacial | surface tension [N · m$^{-1}$] | spread rate [m$^2$ · s$^{-1}$] | tension momentum [N · m$^{-1}$ · s] | area [m$^2$] |
| Chemical | chemical potential [J · mol$^{-1}$] | molar flow [mol · s$^{-1}$] | not applicable | number of moles [mol] |
| Thermal | temperature [K] | entropy flow rate [W · K$^{-1}$] | not applicable | entropy [J · K$^{-1}$] |

Energy: The term 'energy' is the measure of the capacity to do work. Energy used is the same thing as work done plus losses. Energy exists in various forms and is stored as potential energy in any of the domains, or as kinetic energy in most scenarios. Various physical mechanisms exist as means to convert energy between domains, and as means for containing and releasing energy in/out of storage. Conversion between or within a domain always involves some "gear ratio" designed into the device. The ratio may be fixed or variable, depending on the configuration of a particular design.

Power: The term 'power' is the instantaneous rate of energy flowing with respect to time (i.e., mathematically the time derivative of energy). Therefore, energy is the integral of power with respect to time. Energy and power cannot be measured directly as entities, but are measured as a conjugate pair of variables within any of the domains, as identified in Table 1. It is useful to list the conjugate variables in four main generalized groups, with each group having identical characteristics. Hereafter, the four groups are referred to as generalized effort, flow, momentum and displacement. In every domain, momentum is the time integral of effort, and effort is the time derivative of momentum. In every domain, displacement is the time integral of flow, and flow is the time derivative of displacement (i.e., rate of displacement per unit of time).

Power in every domain is calculated by multiplying effort by flow. Stored potential energy in every domain is characterized by the measured relationship between the effort and displacement for that domain. In the domains where it is known to exist, stored kinetic energy is characterized by the measured relationship between the flow and the momentum for that domain. The overall efficiency is measured from energy-out divided by energy-in, and instantaneous efficiency is known from power-out divided by power-in.

Equipment capacity limitations: The term 'Equipment capacity limitations' refers to limitations of energy capacity when considering storage devices, but the capacity of all conversion and transmission devices must be defined in terms of power.

Hydraulic fluid: The term 'Hydraulic fluid' refers to medium capable of being pressurized for use in hydraulic machinery. The hydraulic fluid can be a liquid, a gas or a combination of liquid and gas in predeterminate proportions.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a jetstream power generating system.

Another object of the present disclosure is to provide a jetstream power generating system that facilitates continuous power supply at constant rate.

Still another object of the present disclosure is to provide a jetstream power generating system that is capable of dynamically matching its impedance with the generated power.

Yet another object of the present disclosure is to provide a jetstream power generating system that facilitates energy storage and retrieval thereof.

Still another object of the present disclosure is to provide a jetstream power generating system that avoids electric power fluctuation.

Yet another object of the present disclosure is to provide a jetstream power generating system that maintains a desired range of positive tether tension.

Still another object of the present disclosure is to provide a jetstream power generating system that minimizes the wear and tear of the tether.

Yet another object of the present disclosure is to provide a jetstream power generating system that facilitates retrieval of the tether without need for an external power supply.

Still another object of the present disclosure is to provide a jetstream power generating system that facilitates stationary holding of the tethered craft for a desired time without generating power.

Yet another object of the present disclosure is to provide a jetstream power generating system that facilitates transmission of energy from the tether to the winch or capstan arrangement efficiently.

Still another object of the present disclosure is to provide a jetstream power generating system that facilitates guiding of the tether at any desired range of angle between a ground-based station and a craft.

Yet another object of the present disclosure is to provide a jetstream power generating system that facilitates tether alignment with the wind and jetstream azimuth.

Still another object of the present disclosure is to provide a jetstream power generating system that minimizes twisting and bend-straighten of the tether.

Yet another object of the present disclosure is to provide a jetstream power generating system that avoids premature fatigue and maintains the undeployed length of the non-extended tether stress free.

Yet another object of the present disclosure is to provide a jetstream power generating system that is economical and environmentally responsible.

Still another object of the present disclosure is to provide a jetstream power generating system that generates power safely, consistently and reliably.

Still another object of the present disclosure is to provide a jetstream power generating system that is easy to manufacture, transport, site, assemble, operate, maintain and repair.

Another object of the present disclosure is to integrate proven, existing manufactured components (COTS=commercial, off-the shelf), with commonly available materials, calibrated and verified performance metrics, for a jetstream power generating system.

Still another object of the present disclosure is to provide a jetstream power generating system that maximizes the use of abundant materials, and minimizes demand for scarce mined materials and natural resources.

Yet another object of the present disclosure is to provide a jetstream power generating system that offers recyclability of the components.

Another object of the present disclosure is to provide a jetstream power generating system that can be deployed in infrastructural farms.

Yet another object of the present disclosure is to provide a jetstream power generating system that makes valuable use of relatively limited-access airspace to generate power.

Other objects and advantages of the present disclosure will be more apparent from the following description when read in conjunction with the accompanying figures, which are not intended to limit the scope of the present disclosure.

SUMMARY

The present disclosure envisages a jetstream power generating system. The jetstream power generating system comprises an airborne element configured to be subjected to lift forces while flying in a jetstream, a capstan drum, a tether coupled between the airborne element and the capstan drum, an arcuate guide track associated with the capstan drum, a kite tracker displaceably mounted on the guide track, a conversion unit configured to be coupled to the capstan drum, a plurality of accumulators configured to fluidly communicate with the conversion unit, and a generator. The airborne element is a pumping kite.

The kite tracker is configured to securely guide the tether to rotate the capstan drum in a first direction with a force equivalent to the lift force to facilitate payout of the tether, and further to rotate the capstan drum in a second direction when the tether is reeled in.

The conversion unit is configured to be driven by the capstan drum, when the capstan drum is rotated in the first direction, to pressurize hydraulic fluid passing there through.

Each accumulator is configured to receive, store and release the pressurized hydraulic fluid therein.

The generator is configured to receive the pressurized hydraulic fluid to facilitate generation of electric power.

In an embodiment, the conversion unit includes a shaft extending from the capstan drum, a planetary gear-train and a plurality of first hydraulic pumps. The planetary gear-train is defined by a sun gear configured to be mounted on the shaft to be driven by the capstan drum, and a plurality of planet gears configured to mesh with the sun gear. Each first hydraulic pump is configured to engage with each planet gear. The hydraulic pump is configured to be driven by the planet gear to facilitate pressurization of the hydraulic fluid passing therethrough.

In an embodiment, the first hydraulic pumps are piston pumps.

In another embodiment, each piston pump includes a solenoid valve. The solenoid valve is configured to activate or deactivate the piston chamber of the piston pump.

In another embodiment, the first hydraulic pumps are motors.

In an embodiment, the system includes a second hydraulic pump configured to fluidly communicate with the accumulators to receive the stored pressurized fluid therefrom to rotate the generator.

In an embodiment, the first hydraulic pumps are configured to be driven in a reverse direction to facilitate the reversal in the direction of motion of the gear-train, to further facilitate rotation of the capstan drum in the second direction.

In an embodiment, the accumulators are configured to direct the pressurized hydraulic fluid to the first hydraulic pumps to drive the first hydraulic pumps in the reverse direction.

In an embodiment, the conversion unit includes a dynamometer connected to the shaft extending from the capstan drum, the dynamometer being configured to be driven by the capstan drum to dissipate energy therein.

In an embodiment, the system includes a control unit configured to communicate with the first hydraulic pumps. The control unit is configured to sync the actuation of the first hydraulic pumps to enable rotation of the capstan drum in the second direction.

In another embodiment, the control unit is configured to communicate with a remote device to receive inputs corresponding to payout and reeling in of the tether from the airborne element.

In another embodiment, the airborne element is a tethered gyro glider.

In an embodiment, the kite tracker includes a frame that is configured to hold a first arm and a second arm. The first arm is configured to be connected to the capstan drum. The second arm is configured to extend from the frame at a first predetermined angle. The second arm is configured to securely receive the tether thereon to facilitate handling of the tether.

In an embodiment, the second arm is configured to extend from the frame at a first predetermined angle ranging between 30° and 80°.

In an embodiment, the frame includes a leg and a pair of wheels attached on an operative bottom portion of the leg by means of at least one axle for displacing the kite tracker on the guide track. In another embodiment, the frame includes a pair of axles.

In an embodiment, an operative central axis of the sun gear is configured to be coincidental to an operative central axis of the capstan drum.

In an embodiment, the dynamometer is an absorbent dynamometer selected from a group consisting of eddy current dynamometer, magnetic powder dynamometer, hysteresis dynamometer, electric generator dynamometer, fan dynamometer, hydraulic dynamometer, force lubricated oil shear dynamometer and water dynamometer.

In an embodiment, the generator is a synchronous generator.

BRIEF DESCRIPTION OF THE ACCOMPANYING DRAWING

A jetstream power generating system of the present disclosure will now be described with the help of the accompanying drawing, in which:

FIG. 1 illustrates the large fluctuations of instantaneous power flowing into and out of a ground-based power station of a pumping kite power generating system operating in the jetstreams during one full cycle;

FIGS. 2A through 2D illustrate the large tensile structure of the tether connecting the flight craft and the ground station, and the consequences of tension dropping too low as a result of failing to limit tether pay out velocity within limits imposed by flight vehicle and tether control authority; wherein FIGS. 2B through 2D demonstrate the ranges of angles and resulting forces affecting the tether tracker component;

FIGS. 15A and 15B illustrate exemplary embodiments of the kite tracker in two orientations relative to two different wind directions. The angle subtended by the track in these exemplary embodiments can range from 60° to 360°;

FIG. 16 illustrates a cross-section of an embodiment of the circular track or tracks that restrain the kite tracker;

FIGS. 17A and 17B illustrate two possible embodiments of the tether storage means utilizing a carousel-type arrangement and a drum-type arrangement;

DETAILED DESCRIPTION

Embodiments of the present disclosure will now be described with reference to the accompanying drawing.

Embodiments are provided to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used in the present disclosure is only for the purpose of explaining a particular embodiment, and such terminology shall not be considered to limit the scope of the present disclosure. As used in the present disclosure, the forms "a," "an," and "the" may be intended to include the plural forms as well, unless the context clearly suggests otherwise. The terms "including," and "having," are open ended transitional phrases and therefore specify the presence of stated features, elements and/or components, but do not forbid the presence or addition of one or more other features, elements, components, and/or groups thereof.

Figure 1:
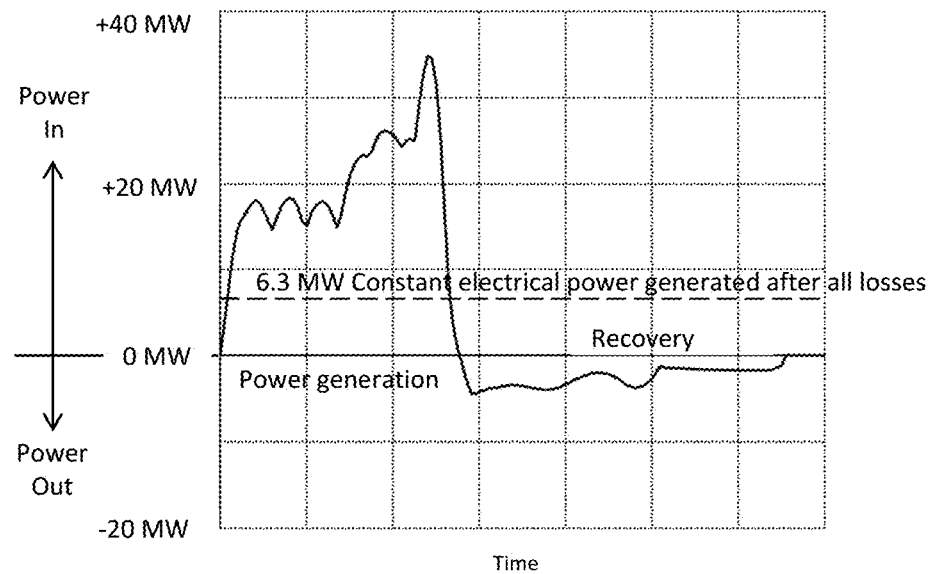
Figure 2A:
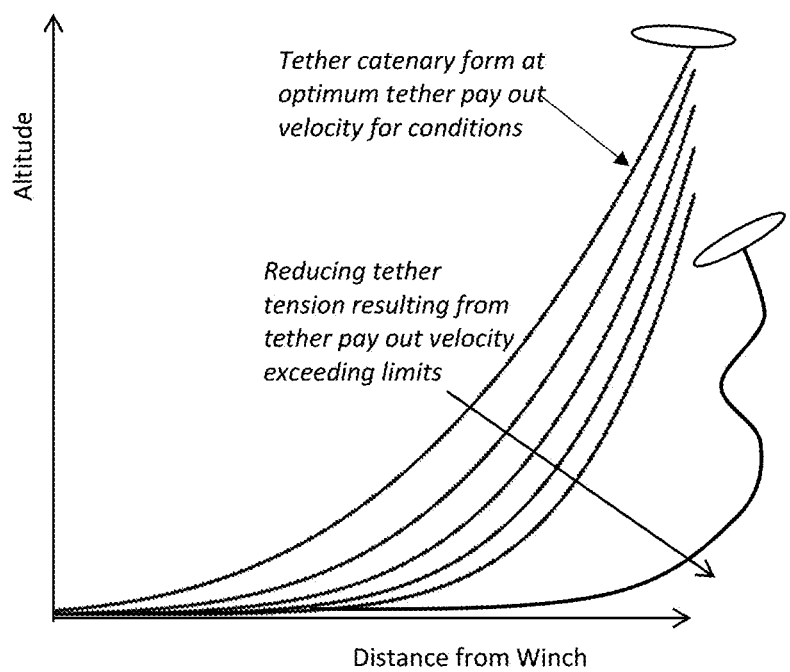
Figure 2B:
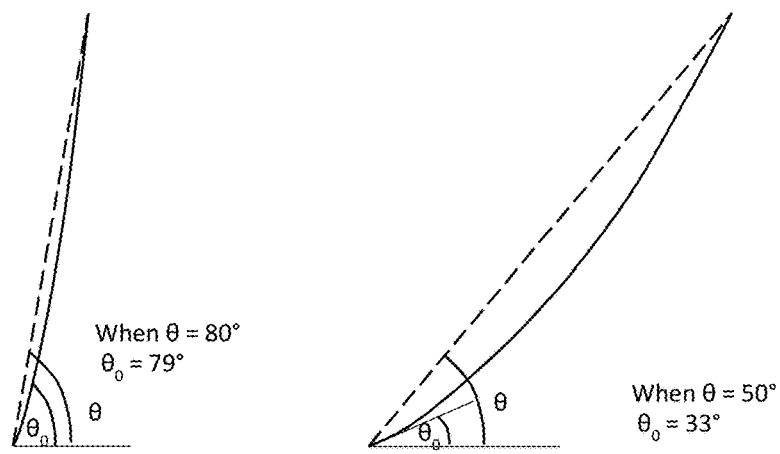
Figure 2C:
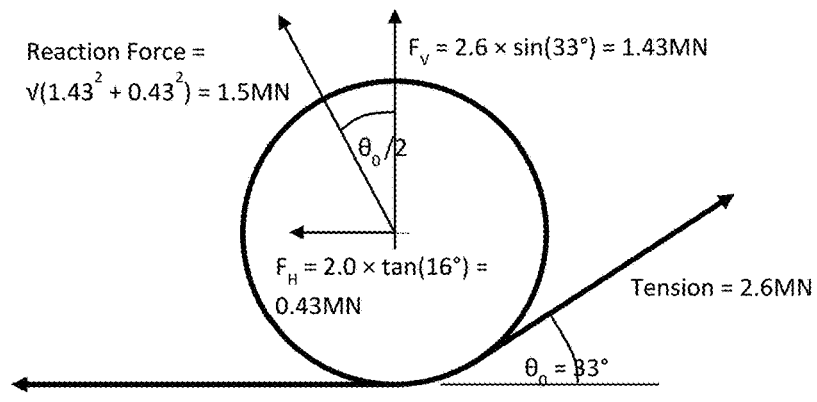
Figure 2D:
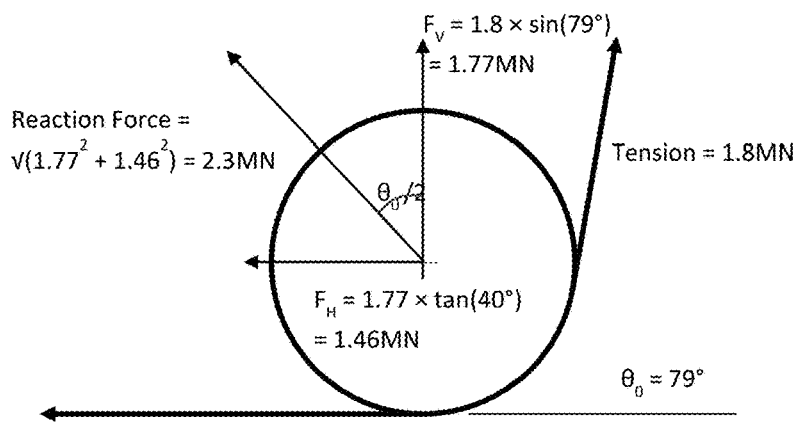

FIG. 1 illustrates the large fluctuations of instantaneous power flowing into and out of a ground-based power station of a pumping kite power generating system operating in the jetstreams during a typical harnessing cycle. These fluctuations in power must be managed in order to make use of the available power, and the present invention makes it possible to use well understood technologies in the right combination to harness, contain, release and modulate this energy for constant electrical power generation, safely, reliably and economically. The plotted behavior, shown in FIG. 1, is the output from a flight simulation in which power equals tether tension multiplied by the tether velocity, which is modulated by the ground power station. The aircraft is capable of coordinating with the ground station and vice versa to harness maximum amount of the available energy, as is useful, prudent and profitable. The 6.3 MW line as seen in FIG. 1 represents constant output that is net of all losses and a withdrawal from the stored energy. In other words, this represents a comprehensive control of the dynamic forces harnessed from prior art, which are now a constant output from the system of the present disclosure. This illustrates modeling of a single generating unit of a nominal size and subject to optimization; anticipated jetstream power generating farms will employ thousands of such mass-produced units, aggregating to nominal capacity of 20 GW and 100 TWh/year production based on 5,000 hours/year jetstream force availability.

FIG. 2 illustrates the large tensile structure of the tether connecting the flight craft and the ground station, and the consequences of tension dropping too low as a result of failing to limit tether pay out velocity within limits imposed by wind conditions. The craft loses lift, and there is a loss of tension in the tether, further reducing lift and so on. Control over any kite-type craft is entirely dependent upon there being adequate tension in the tether, so losing tension means losing control.

Therefore, there is need for a jetstream power generating system that alleviates the aforementioned impediments.

A jetstream power generating system of the present disclosure will now be described in detail with reference to FIG. 3 through FIG. 20. The jetstream power generating system is capable of accessing and converting enormous jetstream forces (approximately 30 to 50 times more than wind forces on the ground) and accomplishing dynamic impedance matching.

Figure 3:
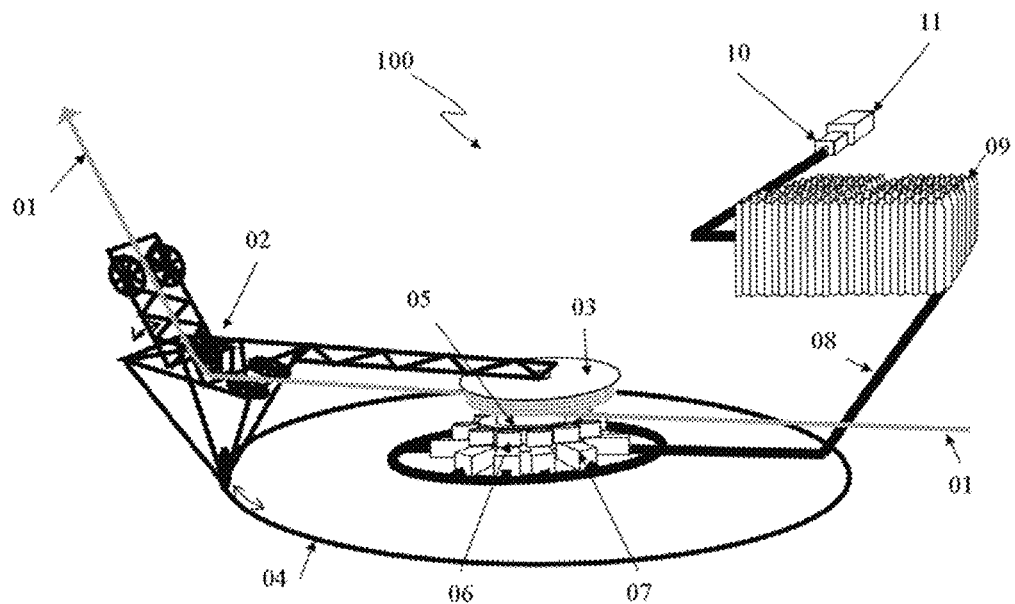
FIG. 3 illustrates a perspective view of a ground-based power system in accordance with the present disclosure.

The jetstream power generating system 100 (hereinafter referred to as 'the power generating system 100') is illustrated in FIG. 3.

The power generating system 100 comprises an airborne element (not shown in figures) configured to be subjected to lift forces while flying in a jetstream, a capstan drum 03, a tether 01 coupled between the airborne element and the capstan drum 03, an arcuate guide track 04 associated with the capstan drum 03, a kite tracker 02 displaceably mounted on the guide track 04, a conversion unit configured be coupled to the capstan drum 03, a plurality of accumulators 09 configured to fluidly communicate with the conversion unit, and a generator 11.

In an embodiment, the airborne element is a pumping kite.

In another embodiment, the airborne element is a tethered gyro glider.

In an embodiment, the kite tracker 02 is configured to securely guide the tether 01 to rotate the capstan drum 03 in a first direction with a force equivalent to the lift force to facilitate payout of the tether 01, and to rotate the capstan drum 03 in a second direction when the tether 01 is reeled in.

In an embodiment, the first direction is the direction that facilitates power generation, and the second direction is the direction that enables recovery.

The conversion unit is configured to be driven by the capstan drum 03, when the capstan drum 03 is rotated in the first direction, to pressurize hydraulic fluid passing therethrough.

Each accumulator 09 is configured to receive, store and release the pressurized hydraulic fluid therein.

The generator 11 is configured with a second hydraulic pump/motor to receive the pressurized hydraulic fluid to produce rotation and facilitate generation of electric power.

In an embodiment, the conversion unit includes a shaft 12 extending from the capstan drum 03, a planetary gear-train and a plurality of first hydraulic pumps 07. The planetary gear-train is defined by a sun gear 05 configured to be mounted on the shaft 12 to be driven by the capstan drum 03, and a plurality of planet gears 06 configured to mesh with the sun gear 05. Each first hydraulic pump 07 is configured to engage with each planet gear 06. The hydraulic pump 07 is configured to be driven by the planet gear 06 to facilitate pressurization of the hydraulic fluid passing therethrough.

In an embodiment, the first hydraulic pumps 07 are piston pumps.

In another embodiment, each piston pump includes a solenoid valve. The solenoid valve is configured to activate or deactivate the piston chamber of the piston pump. In yet another embodiment, the piston pump can include more than one solenoid valve. The valve facilitates increase in the number of discrete conversion ratios by a factor equivalent to the number of pistons per first hydraulic pump. For example, consider first hydraulic pumps 07, each pump provided with three pistons, the number of discrete conversion ratios can be increased from fifteen to forty five, providing granularity of control while greatly improving the overall efficiency of the power generating system.

In another embodiment, the first hydraulic pumps 07 are motors.

In an embodiment, the conversion unit includes secondary gears 13 meshingly connected to the planet gears 06 and the first hydraulic pumps 07.

In an embodiment, the capstan drum 03 preferably has a large diameter that allows the connection of the capstan drum 03 to the gear train. In a preferred embodiment, the capstan drum 03 is connected to the sun gear 05, such that the axis of the capstan drum 03 is coincidental to the axis of the sun gear 05. The torque produced as a result of the tension of the tether during the movement of the pumping kite is split among the planetary gears 06.

In an embodiment, the system includes a second hydraulic pump 10 configured to fluidly communicate with the accumulators to receive the stored pressurized fluid therefrom to rotate the generator 11.

In an embodiment, the first hydraulic pumps 07 are configured to be driven in a reverse direction to facilitate the reversal in the direction of motion of the gear-train, to further facilitate rotation of the capstan drum 03 in the second direction.

In an embodiment, some amount of the pressurized hydraulic fluid is reserved in the accumulators 09 for driving the capstan 03 in an operatively reverse direction through the first hydraulic pump 07, and the gear arrangement during the retrieval phase. In an embodiment, when required, the accumulators 09 are configured to direct the pressurized hydraulic fluid to the first hydraulic pumps 07 to drive the first hydraulic pumps in the reverse direction.

In an embodiment, the conversion unit includes a dynamometer 15 connected to the shaft 12. The dynamometer 15 is configured to be driven by the capstan drum 03 to therein convert energy to heat and dissipate that heat, acting on command by a control unit (not shown in figures) to behave as a brake.

In an embodiment, the system 100 includes a control unit (not shown in figures) configured to communicate with the first hydraulic pumps 07. The control unit is configured to sync the actuation of the first hydraulic pumps 07 to enable rotation of the capstan drum 03 in the second direction.

In another embodiment, the control unit is configured to communicate with a remote device to receive inputs corresponding to payout and reeling in of the tether from the remote device.

In an embodiment, the accumulators are configured to be in fluid communication with the first hydraulic pumps with the help of a network of pipes and valves 08.

In an embodiment, the first hydraulic pump and the second hydraulic pump are positive displacement hydraulic motors. In an embodiment, the generator is a synchronous generator.

Figure 4:
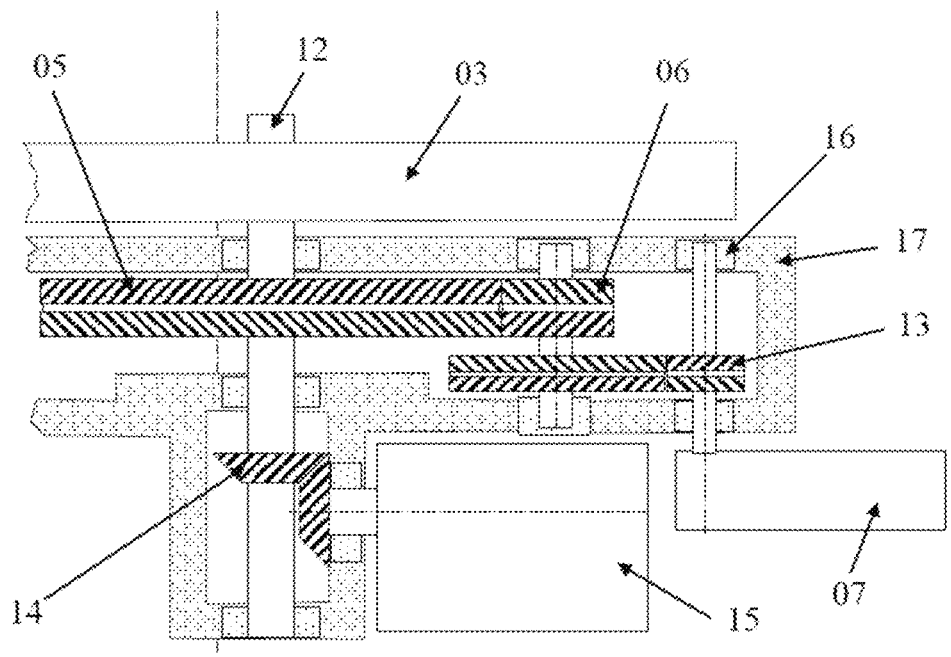
FIG. 4 illustrates an arrangement for connecting the capstan, the absorbent dynamometer and multiple first hydraulic pumps in order to split the capstan torque between them.

FIG. 4 illustrates an arrangement for connecting the capstan 03 with the absorbent dynamometer 15 and multiple first hydraulic pumps 07. The dynamometer 15 and the plurality of first hydraulic pumps 07 are configured to split the capstan torque between them. In an embodiment, if the deployment of tether exceeds safe zone parameters, the dynamometer 15 is engaged.

In an embodiment, the dynamometer 15 is an absorbent dynamometer selected from a group consisting of eddy current dynamometer, magnetic powder dynamometer, hysteresis dynamometer, electric generator dynamometer, fan dynamometer, hydraulic dynamometer, force lubricated oil shear dynamometer and water dynamometer.

In another embodiment, for large power capacity (greater than ten megawatts power) systems, the preferred type of the absorbent dynamometer is a force lubricated oil shear absorbent dynamometer or a water absorbent dynamometer.

In an embodiment, the planetary gear-train includes at most fifteen planet gears 06.

In an embodiment, the sun gear 05 and the planet gears 06 are double helical gears.

The double helix or herringbone arrangement eliminates thrust loads and provides for greater tooth overlap and smoother operation, which is important with fluctuating torque levels.

In an embodiment, the dynamometer 15 is connected to the shaft by means of a bevel gear arrangement 14.

In an embodiment, there could be a possibility of increase in gear torque or reduction in angular velocity between the absorbent dynamometer drive shaft and the primary drum shaft. In order to alter the torque-speed ratio, the sun gear 05 engages a plurality of planet gears 06 of smaller diameter that facilitate equal division in the torque generated by the abutment of the tether 01 and the capstan drum 03 between each planet gear 06. Since the planet gears 06 are smaller than the sun gear 05, the torque is reduced and the angular velocity is increased. In another embodiment, in order to extend the working life of the gears 05, 06 and improve their reliability, the reduction in size is kept below 4:1. In yet another embodiment, at least one further reduction stage 13 is required between the planet gears 06 and each of the first hydraulic pumps 07 to achieve the torque and angular velocity required by the first hydraulic pumps 07.

In an embodiment, the gear-train is lubricated and sealed inside a substantial housing arrangement 17 to support various shaft bearings 16 coupled to the secondary gears 13.

Figure 5:
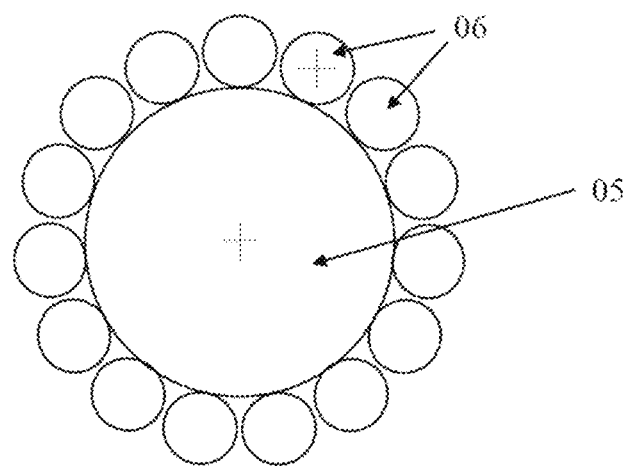
FIG. 5 illustrates an arrangement for splitting the residual torque of the sun gear equally between planetary gears and at the same time reducing the torque and increasing the velocity at each gear shaft.

FIG. 5 illustrates an arrangement configured to facilitate splitting of the residual torque of the sun gear 05 equally among the planetary gears 06, while simultaneously reducing the torque and increasing the velocity at each gear shaft. As the reduction ratio of each stage is limited to ensure longevity and reliability, the maximum torque that can be split is up to fifteen equal divisions, which is enabled by the provision of the fifteen planetary gears 06. The large number of planetary gears 06 ensures that the system is rigidly supported, obviating the need for a ring gear.

There are numerous advantages to employing a torque-splitting arrangement and a plurality of first hydraulic pumps, including but not limited to the ability to decouple any first hydraulic pump to facilitate maintenance or replacement, and the ability to select first hydraulic pumps of convenient size for commercial availability and easing installation logistics.

Figure 6A:
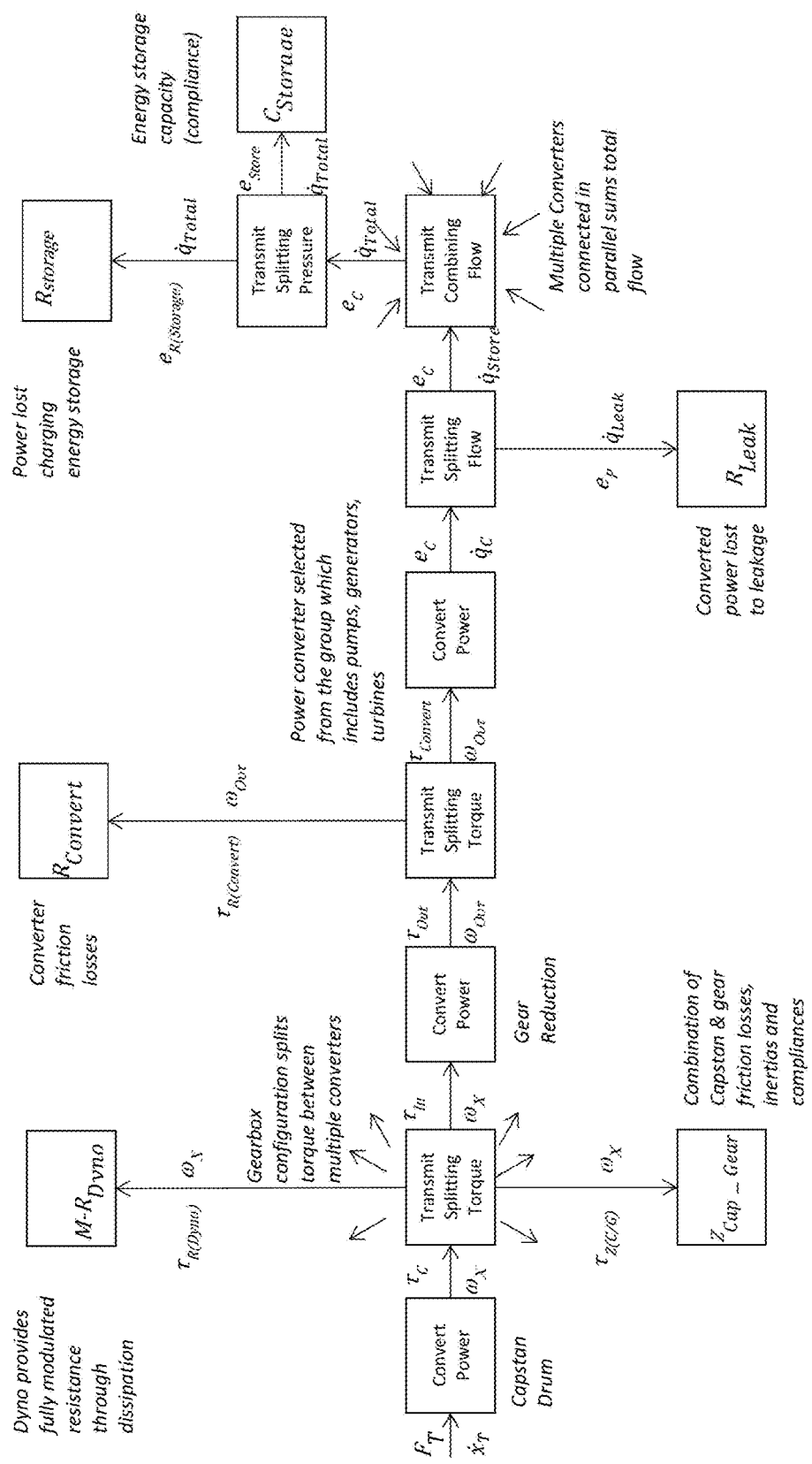
FIGS. 6A and 6B illustrate the flow of energy during the energy generation phase of the cycle, which charges the energy storage device.
Figure 6B:
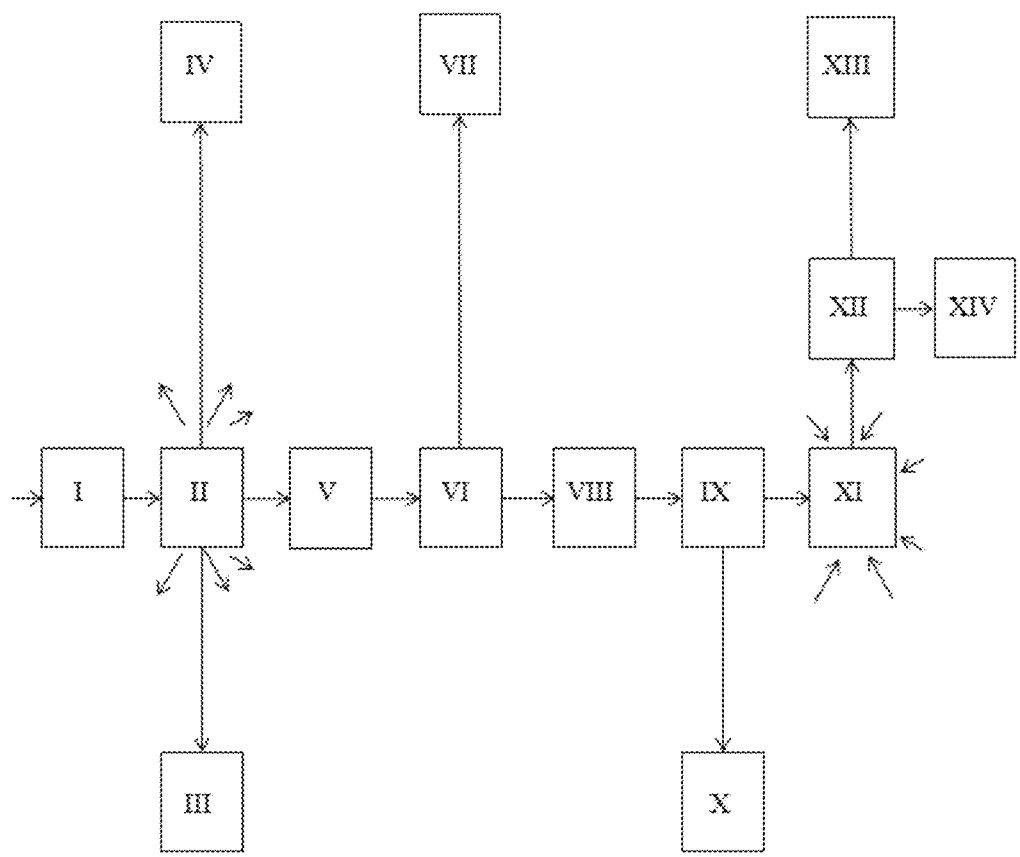

FIGS. 6A and 6B illustrate the flow of energy during the generating phase of the cycle that charges the energy storage device 09. Each arrow represents the flow of energy, or the power, defined by a pair of conjugated variables whose product equal the power represented by the arrow. On each horizontal arrow, the upper variable represents an effort or difference in tension between the connected blocks, the lower variable is the resulting flow, or displacement per unit time. On the vertical arrows, the effort is on the left, while the flow is on the right. At a transmitting junction, either effort is split with the same flow being common to each branch (a series transmission), or flow is split with the same effort being common to each branch (a parallel transmission). Convert blocks enable power to be tracked even when gearing is employed, and also when transduction from one energy form to another takes place.

In the same FIGS. 6A and 6B, conversion is loss-less, the losses being accounted for at the transmit junctions. The single port blocks at the end of branches represent the properties driving the impedances of the system; dissipative resistances where energy is lost from the network, inertias causing kinetic energy to be contained and released, and compliances causing potential energy to be contained and released.

Power enters the network on the left of FIGS. 6A and 6B, with the tensile force in the tether 01 (labelled FT), conjugated with its linear velocity (labelled) T). As stated, multiplying the two variables on each arrow always produces the power associated with that branch at a point in time. The energy network of the system ends at the right of the Figures, where the harnessed energy minus losses is being stored. This generic network is the same for all means and embodiments of energy conversion and energy storage in a ground-based power system for tethered craft.

The power variables of FIG. 6A are as follows:

$F_T$ is the instantaneous tensile force of the tether 01 as it abuts the periphery of the capstan drum 03;

$\dot{x}_T$ is the instantaneous payout (or retrieval) velocity of the tether as it abuts the periphery of the capstan drum 03; and $\tau_C$ is the instantaneous torque imparted to the shaft 12 of the capstan drum 03 by the tensile force of the tether 01, which is a function of the number of wraps and the friction coefficient between the tether 01 and the drum 03. The number of wraps is controlled to impart more than 99% of the tether tensile force.

As a result, it can be said that $$\tau_C = F_T \times K_I$$

where $K_I$ is the conversion coefficient for the capstan drum 03, in this case, the radius of the drum 03.

$\omega_C$ is the instantaneous angular velocity of the capstan drum 03.

The relationship between angular velocity and linear velocity is $$\omega_C = \dot{x}_T / K_I$$

$\tau_{R(Dyno)}$ is the instantaneous torque imparted to the shaft 12 of the capstan drum 03 by the absorbent dynamometer 15. The dynamometer 15 provides a means of providing a modulated load on the shaft 12 that is infinitely variable within its operating range, thereby acting as a brake when the tensile force in the tether 01 will result in payout velocity exceeding the limit set by the wind velocity experienced by the craft.

$\tau_{Z(C/G)}$ is an instantaneous torque resulting from (i) the need to overcome the frictional resistances in the capstan drum 03 and gear-train; (ii) the containing of kinetic energy during acceleration, or the releasing of kinetic energy during deceleration as a result of capstan and gear-train inertias; and (iii) the releasing of potential energy during acceleration, or the containing of potential energy during deceleration as a result of capstan and gear-train compliances.

$\tau_{In}$ is the instantaneous residual torque imparted to one of a plurality of planet gears 06.

Therefore;

$$\tau_{In}=(\tau_C-\tau_{R(Dyno)}-\tau_{Z(C/G)})/n$$

Where n is the number of planet gears 06 into which the residual capstan torque will be split between sun gear 05 and planet gears 06.

$\tau_{Out}$ is the instantaneous torque available at the output shaft following all stages of gear reduction for one single planet, which is used to drive a first hydraulic pump from rotational energy into another form.

$$\tau_{Out}=\tau_{In}\times K_V$$

where $K_V$ is the conversion coefficient for the gear-train, in this case the reduction ratio between the capstan shaft and the first hydraulic pump input shafts.

$\omega_{Out}$ is the instantaneous angular velocity of the output shaft following all stages of gear reduction for one single planet.

$$\omega_{Out}=\omega_C/K_V$$

$\tau_{R(Convert)}$ is the instantaneous torque dropped as a result of friction losses in one of a plurality of first hydraulic pumps.

$\tau_{Convert}$ is the residual instantaneous torque that will be transduced into the output effort of one of a plurality of first hydraulic pumps.

$$\tau_{Convert}=\tau_{Out}-\tau_{R(Convert)}$$

$e_C$ is the instantaneous output effort of one of a plurality of first hydraulic pumps, for example pressure.

$$e_C=\tau_{Convert}\times K_{VIII}$$

where $K_{VIII}$ is the conversion coefficient for the first hydraulic pump, for example the angular displacement per unit volume displaced by a pump.

$\dot{q}_C$ is the instantaneous output flow or displacement per unit time of one of a plurality of first hydraulic pumps, for example volume flowing per second.

$$\dot{q}_C=\omega_{Out}/K_{VIII}$$

$\dot{q}_{Leak}$ is the instantaneous parasitic leakage flow or displacement per unit time of one of a plurality of first hydraulic pumps, for example volume back-flowing per second inside a pump.

$\dot{q}_{Store}$ is the residual instantaneous output flow or displacement per unit time of one of a plurality of first hydraulic pumps that are connected in parallel to the plurality of energy storage devices.

$\dot{q}_{Total}$ is the combined total instantaneous flow into storage.

$$\dot{q}_{Total}=\dot{q}_{Store}\times n$$

Where n is again the number of planets into which the residual capstan torque was split.

$e_{Store}$ is the instantaneous reaction effort at the energy storage, which depends upon its state of charge at that instant.

$e_{R(Storage)}$ is the instantaneous effort available to drive further flow into storage.

$$e_{R(Storage)}=e_C-e_{Store}$$

It is apparent that the efforts and flows of any branch in the network can be referred back to the initial input conjugates using simple multiplication or division of the known parameters and coefficients n, $K_I$, $K_V$ and $K_{VIII}$, and a knowledge of resistances, inertias and compliances throughout the network. Given the knowledge of the lift or hydro power forces during a craft's flight profile, it is therefore a trivial matter to calculate the reaction forces of the ground station during that flight profile for a range of properties that might be design parameters of the ground station.

Referring to FIG. 6B, in block I, linear power is converted into rotational power. The tensile force $F_T$ in the tether 01 is multiplied by the radius of the capstan drum 03 to become a shaft torque $\tau_C$. The linear velocity is divided by the radius of the capstan drum 03 to become the rotational velocity $\omega_C$ of the capstan. These are the same torque and velocity at the sun gear 05 since they are on the same shaft. The torque $\tau_C$ is then split in block II between multiple planetary gears 06, the rotational frictional resistance in block III and a modulated absorbent dynamometer 15 resistance in block IV. By subtracting frictional torque $\tau_{Z(C/G)}$ and the modulated torque $\tau_{R(Dyno)}$ due to the absorbent dynamometer 15 resistance, the residual torque is split equally among the planetary gears to give an input torque $\tau_{In}$ at each shaft. The ratio of the number of gear teeth between the sun gear 05 and each planet gear 06 and any further reduction stages exemplified by 13 means that a further conversion takes place in block V, dividing torque by the ratio, and multiplying angular velocity by the ratio. This results in a lower torque $\tau_{Out}$ and higher rotational velocity $\omega_{Out}$ for each input shaft to the first hydraulic pump 07 represented by block VIII. Any further frictional resistance $\tau_{R(convert)}$ associated with the first hydraulic pump 07 is dropped at block VI, leaving an input torque and the same angular velocity $\omega_{Out}$. Again, the input power at each first hydraulic pump 07 is the product of these two conjugated variables.

The power conversion from the rotational form that takes place in block VIII and physically in the first hydraulic pumps 07 can be cast into many different useful forms. For that reason, in order to describe the further steps leading to the harnessed energy being stored, the conjugate power variables will be referred to in generalized terms, and then a particular embodiment will be described. Instead of referring to force or torque or voltage or pressure, the generalized term effort will be applied, and given the symbol e. At the same time, instead of referring to linear or angular velocity, or electric current or volumetric flow, the generalized term flow will be applied and given the symbol $\dot{q}$ to show that it is a derivative of a displacement with respect to time. For all forms of energy, the product of effort and flow ($e\times\dot{q}$) is power (energy per unit time).

Referring again to FIG. 6B, the output of each individual first hydraulic pump before losses is expressed as the effort eC and flow $\dot{q}_C$. Additional power losses in the first hydraulic pump that associated with leakages of flow (rather than effort being dropped at a resistance) are accounted for at block IX, leaving the effort eC and a flow $\dot{q}_{Store}$ defining the rate of energy flow into storage. Block X represents the resistance to leakage at the first hydraulic pumps 07.

In block XI the multiple first hydraulic pumps are connected in parallel, which means that the flows are combined (summed) to give $\dot{q}_{Total}$ but the efforts are equal on each branch.

The effort at the storage device at any point in time depends upon its state of charge and its compliance (block XIV). Compliance is the generalized relationship between effort e and displacement q as energy is stored in any form. The effort at the storage device is labelled eStore. The difference between eC and eStore, labelled eR(Storage) and which, when positive, means that a flow will take place into storage 09 (whatever the energy form). However, the rate of flow depends on the value of RStorage in block XIII, or more specifically the relationship between effort and flow that does not have to be linear, such as in the case of electrical resistance where current flow would be simply the voltage difference between, say, a battery bank and a generator, divided by RStorage. The block XII accounts for the splitting of effort from the first hydraulic pumps between the resistance and the energy storage.

Power sources, whatever the form, may be effort sources or flow sources, but never both. The power source in this instance is the craft pulling on the tether, and it is an effort source. When a power source is an effort source, the effort is determined by that source, and the resulting flow is determined by the difference between the source effort and the reaction effort at the load. During the generation phase of the cycle, the ground station represents the load, which is a combination of the unavoidable power losses to various resistances to transmission, and a modulated power loss when the variable resistance of the dynamometer is employed. Without any modulation, the flow, which is ultimately the tether payout velocity, is dictated by eR(Storage)=eC−eStore and the resistance to flow RStorage.

This is particularly important for harnessing power from natural sources employing tethered craft, because the tension in the tether can be maintained by limiting the tether payout velocity. Therefore, the ground power system parameter RStorage is a critical one, as is the energy storage compliance CStorage that determines eStore. As can be seen by following the flow of energy in FIGS. 6A and 6B, the variable eC can be modulated by controlling the resistance of the absorbent dynamometer, but when doing so, the energy flowing to block IV is converted to thermal energy, being dissipated and lost unless sophisticated energy recovery mechanisms are employed. Such mechanisms could be beneficial if the significantly higher capital costs are justified.

The characteristics of both the energy storage mechanism and power transmission mechanism between the capstan and the energy storage can be designed to optimally balance the tension in the tether, to minimize the amount of modulation required to limit payout velocity in order to maintain that tension.

These characteristics will be illustrated using a particular embodiment whereby the energy storage device is a bank of hydraulic accumulators with a characteristic compliance CStorage, and the power first hydraulic pumps 07 in block VIII of FIGS. 6A and 6B, converting from the rotational form into the hydraulic form specifically become positive displacement pumps. The power is transmitted between the pumps and the accumulators through a circuit consisting of pipes and control valves, the characteristics of which define the parameter RStorage.

In order to retrieve the tether following the generation phase, a smaller amount of power is required as a result of the flight craft being controlled to reduce the lift force (therefore the tension in the tether) in order to return to its starting point. Again, the velocity of the tether (now being retrieved, so in the reverse or negative direction) must be modulated in order to maintain tension in the tether at a lower level, to ensure the safety, integrity and economy of the entire system. During retrieval, this can be achieved by adjustments to the conversion coefficients (effectively changing gear) rather than by using wasteful dissipative means. This is easily achieved in block VIII for example, by a means described shortly.

The energy flows for tether retrieval are the exact reverse of those shown in FIGS. 6A and 6B, and for convenience the labels for the power variables have been retained. Each of the convert functions also operates in reverse. For the particular embodiment discussed above, in block VIII of FIG. 6B, the conversion is from the hydraulic pressure eC and volumetric flow $\dot{q}_C$ back to the rotational form through the same first hydraulic pumps 07 (positive displacement pumps now acting as hydraulic motors in the particular embodiment, and the conversion coefficient is the pump displacement KVIII). In block V of FIG. 6B, the ratio of the gears 06 and 13 act to reduce the angular velocity ωOut and increase torque output τConvert of the first hydraulic pumps 07, then combine their torques and reduce speed and increase torque further as the planetary gears 06 mesh with the sun gear 05. The capstan 03 will have the same torque and angular velocity by virtue of the connection through the main shaft 12. Finally, in block I of FIG. 6B, the torque τC and angular velocity ωC of the capstan 03 is converted into a line tension FT and linear velocity $\dot{x}_T$ in the tether 01 with the conversion coefficient being the capstan radius. During retrieval, the power source is block XIV of FIG. 6B, the energy storage devices. The system has capacity to contain all of the energy harvested during the generation phase of the cycle, but only a small fraction of that energy is required for tether retrieval during a normal complete generating-recovery cycle. However, when the need arises, there is enough energy available to recover the entire length of the tether without placing any demand on external sources.

In the embodiment employing rotational to hydraulic first hydraulic pumps 07 in the form of positive displacement pumps, it is contemplated that the conversion ratio (pump displacement) is dynamically adjusted by the means of valves that close the fluid path to individual cylinders. With a large plurality of pumps, this provides many increments to the displacement, effectively providing a continuously variable transmission.

In a normal operating cycle of the particular hydrostatic-based embodiment, most of the stored energy is steadily released as fluid flowing out of the accumulators 09 under pressure provided by the accumulators throughout the entire cycle. This power is converted from the hydraulic form into the rotational form by another hydraulic pump 10 driving a simple synchronous generator 11 that converts the rotational power into electrical power for supply to a distribution network.

Figure 7A:
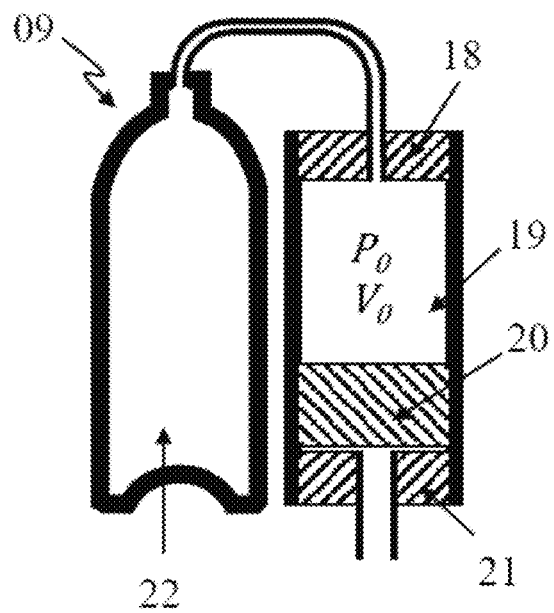
FIGS. 7A and 7B illustrate the core elements of an embodiment of an energy storage means employing a gas-pressurized hydraulic energy storage arrangement.
Figure 7B:
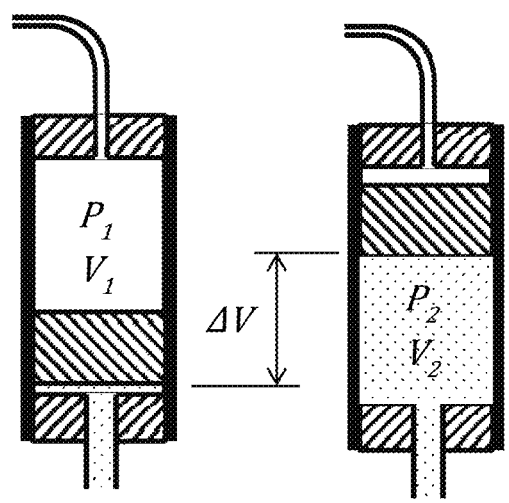

FIGS. 7A and 7B illustrate the core elements of an embodiment of an energy storage means employing a gas-pressurized hydraulic energy storage arrangement. This is particularly suitable for incorporating into an embodiment where the power conversion at block VIII of FIG. 6B is from rotational to the hydraulic form. In this type of device, the piston 20 acts as a separator between the fluid and the gas 19. As pressurized fluid flows in through a valve in the base 21, the volume of gas 19 becomes compressed, increasing pressure on both sides of the piston and so containing hydraulic energy. The volume of gas can be made much larger than that of the stored fluid by connecting additional back-up gas bottles 22 through the cap 18 in order to improve the characteristics of the energy storage. When the fluid is allowed to flow out to a lower pressure, the gas 19 expands, causing the piston 20 to move in the direction of the fluid, forcing the fluid back into the circuit, releasing the hydraulic energy. There are three basic settings of the piston. FIG. 7A shows the accumulator as the gas is pre-charged to the specified pressure P0. At this stage, the fluid side is empty and at atmospheric pressure. The gas back-up volume is designed to provide the desired energy storage characteristics, and the total gas volume at this stage is V0.

FIG. 7B shows the extremes of the operating conditions. On the left, the piston is positioned at the minimum operating pressure $P_1$, with a small amount of fluid in the accumulator. The gas volume at this pressure is $V_1$. On the right is shown the position of the piston at maximum working pressure $P_2$, and the gas volume is now $V_2$. $\Delta V=V_1-V_2$ is the useful volume that can be contained and released between $P_1$ and $P_2$.

The dimensions and number of parallel accumulators and back-up gas bottles, together with the gas pre-charge pressure, determine the characteristics and capacity of the hydraulic energy storage.

Figure 8:
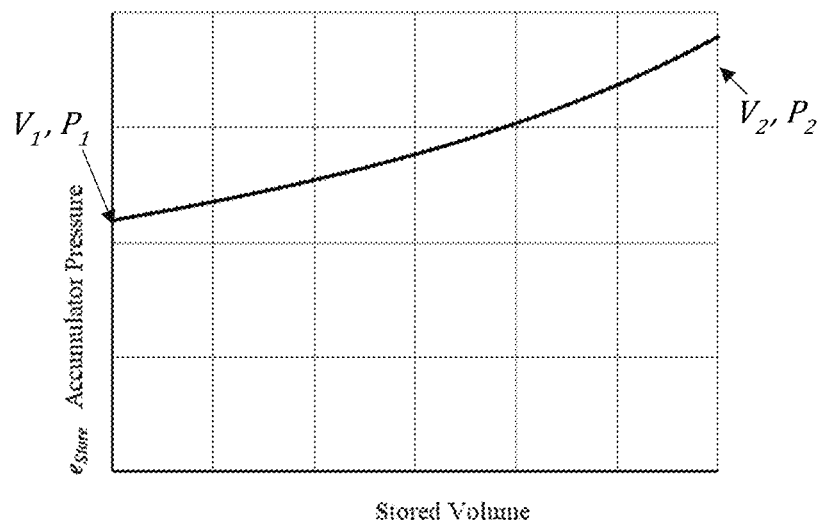
FIG. 8 illustrates the characteristics of the energy storage adjusted to match an operating range of tether tension generated by a tethered craft.

FIG. 8 illustrates the characteristics of the energy storage adjusted to match an operating range of tether tension generated by a tethered craft. For any potential energy storage device, the conjugate variables defining the amount of energy stored at any point in time are a generalized effort and a generalized displacement. In the preferred embodiment employing a hydraulic storage arrangement, the effort is specifically pressure, and the displacement is hydraulic volume at that pressure.

This behavior conforms to a well-known characteristic equation:

$$P = \frac{P_0}{(1 - V/V_0)^k}$$

In which P and V are instantaneous pressure and volume values, and $P_0$ and $V_0$ are the gas pre-charge pressure and volume as previously defined in the description of FIG. 7A. $V_0$ could for example be designed as $2 \times \Delta V$.

The exponent k in this equation is derived from the ratio of specific heats under adiabatic conditions, and takes the value of 1 for isothermal conditions. A value of k=0.9 can be taken for example for conditions to which the energy storage system of the pumping kite's ground-based power system will be subjected.

Energy storage devices of different types can be compared by referring to their energy storage capacity. In hydraulic accumulators, at a pressure $P_2$ of 200 bar (2,900 PSI) for example, 5.6 kWh will be stored for each 1 $m^3$ of fluid, which is equivalent to 21 kWh stored in every 1,000 gallons.

Pressure can be referred back as a force opposing tether tension using a straightforward relationship between pressure and tether tension, determined by the conversion coefficients of blocks I, V and VIII of FIGS. 6A and 6B, or $K_I$, $K_V$ and $K_{VIII}$, namely the capstan radius, the gear-train reduction ratio and the pump displacement, together with the planetary splitting divider n.

The relationship is $F_{Store}=e_{Store}/(K_I \times K_V \times K_{VIII} \times n)$ and where $e_{Store}$ is the instantaneous pressure of the accumulators in this particular embodiment.

The state of charge for the energy storage can be seen as 0% at $V_1$ and 100% at $V_2$.

Figure 9:
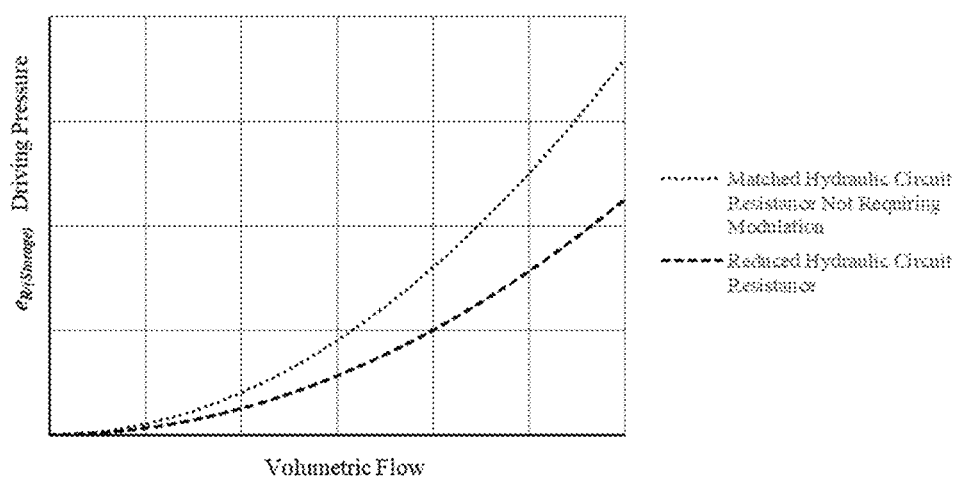
FIG. 9 illustrates the characteristics of an appropriate resistance to flow when charging the energy storage arrangement for the preferred embodiment employing a hydraulic storage arrangement.

FIG. 9 illustrates the characteristics of a matched resistance to flow when charging the energy storage arrangement for the preferred embodiment employing a hydraulic storage arrangement, and a lower resistance to flow that when operated in conjunction with an absorbent dynamometer will allow the total net energy harnessed to be increased dramatically.

The pressure driving flow at any point in time is the difference between the pressure arising at the pumps as a result of the line tension, and the pressure in the accumulators at that point in time. From the characteristic relationship between pressure and volumetric flow, for any given pressure the resulting flow rate is obtained. A similar relationship to that between pressure and tether tension exists between the volumetric flow into the accumulators and the tether payout velocity. Indeed, it is the flow that determines the payout velocity. The relationship is the inverse of the relationship between force and pressure using the same conversion coefficients $K_I$, $K_V$ and $K_{VIII}$ together with the planetary splitting divider n, and is $\dot{x}_T=\dot{q}_{Total} \times K_I \times K_V \times K_{VIII} \times n$ And where $\dot{q}_{Total}$ is the instantaneous volumetric flow rate into the accumulators in this particular embodiment.

If the volumetric flow rate, and therefore the payout velocity, are going to exceed the limit imposed by the wind velocity experienced by the craft because $e_{R(Store)}$ is too high, then the absorbent dynamometer is utilized as the means of modulating $e_{R(Store)}$ and so maintaining volumetric flow.

It is a trivial matter for those skilled in the art to design the hydraulic circuit with the desirable characteristics of FIG. 9.

It is worth noting that the energy, lost to gas compression/expansion and the hydraulic circuit resistance together, represents the largest efficiency losses in the ground-based system. As with tether dynamics and aero-elasticity, which are evaluated as part of the craft control authority, these parameters are explicitly evaluated when studying the system behavior. Other losses, such as the gear-train and pumps for example, have been accounted for based upon well-known performance standards for each type of device.

Figure 10:
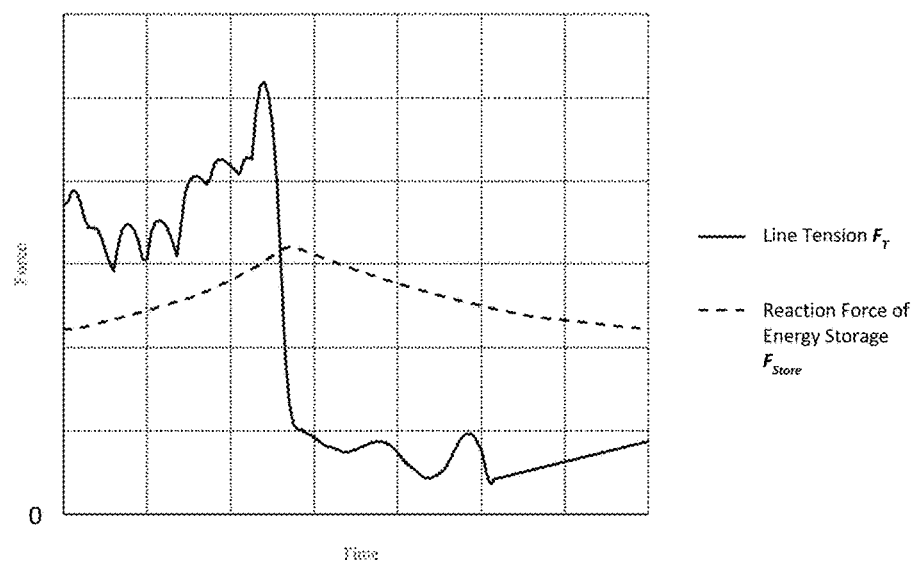
FIG. 10 illustrates the fluctuations in tether tension during a typical flight profile of a tethered kite and compares this with the reaction force resulting from the energy storage in hydraulic accumulators.

FIG. 10 illustrates the fluctuations in tether tension FT during a typical flight profile of a tethered kite and compares this with the reaction force resulting from the energy storage in hydraulic accumulators. The fluctuations in tether tension result from cross-wind maneuvering and other adjustments to lift made during the outbound journey. This force can be compared to the reaction force resulting from the pressure eStore of the accumulators, which is referred back to the point where the tether abuts the capstan drum using the relationship $F_{Store}=e_{Store}/(K_I \times K_V \times K_{VIII} \times n)$.

This force rises during the energy generation phase, due to the characteristics of the energy storage illustrated in FIG. 8. At the end of the energy generation phase, the state of charge will fall as energy is released for both continuous power conversion and tether retrieval. The tether can payout, and therefore energy can be harnessed, when the line tension $F_T$ is greater than the force $F_{Store}$ from the accumulator energy storage. Tether retrieval is possible when $F_T$ is less than $F_{Store}$. The overall position of the line representing $F_{Store}$ is determined by the gas pre-charge pressure $P_0$ and of course the values of $K_I$, $K_V$, $K_{VIII}$ and n.

Figure 11:
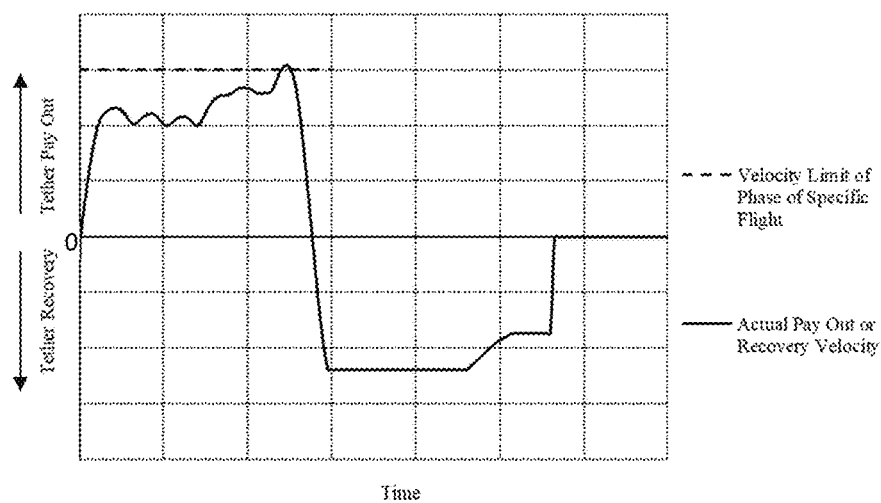
FIG. 11 illustrates the behavior of the payout velocity for a passive or unmodulated energy harnessing and storage system with a matched fluid resistance, responding to the typical flight profile of FIG. 10. The recovery velocity is controlled by adjusting fluid flow and pump displacement.

FIG. 11 illustrates the behavior of the payout velocity $\dot{x}_T$ for a passive or unmodulated energy harnessing and storage system with a matched fluid resistance, responding to the tensions in the tether during the typical flight profile of FIG. 10. The recovery velocity is controlled by adjusting fluid flow and pump displacement. The fluctuations in tether tension result in fluctuations in payout velocity, without exceeding the upper limit on velocity imposed by the wind. Higher tension results in increased pressure driving fluid flow into the accumulators, and a corresponding increased payout velocity.

Figure 12:
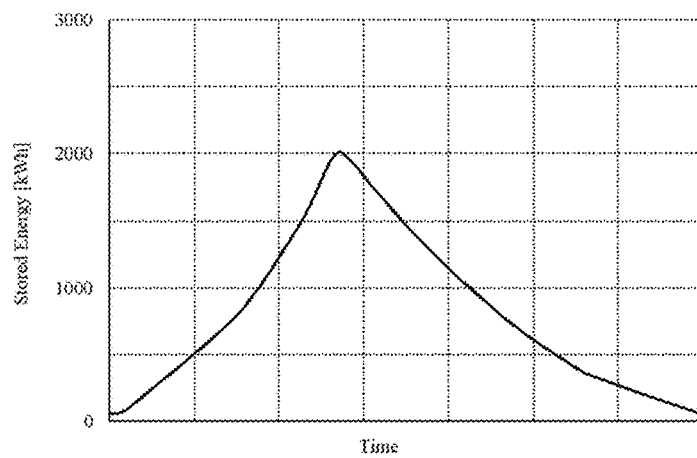
FIG. 12 illustrates the state of charge of the hydraulic accumulators in terms of the energy stored for the velocity profile of FIG. 11.

FIG. 12 illustrates the state of charge of the hydraulic accumulators in terms of the energy stored for the velocity profile of FIG. 11. The state of charge increases as the harnessed energy is contained, even though there is a constant release of the hydraulic energy that is being used to drive an electrical generator.

The inertias of the complete ground system have a significant positive impact on the rates of acceleration and deceleration of the tether paying out. The largest contributions to inertia are the capstan, sun gear and stage one planetary gear masses.

Because the flight was unmodulated, the absorbent dynamometer was not employed, meaning that all of the kinetic energy of the moving craft, minus the losses in transmission and storage, was harnessed for distribution and tether recovery.

Figure 13:
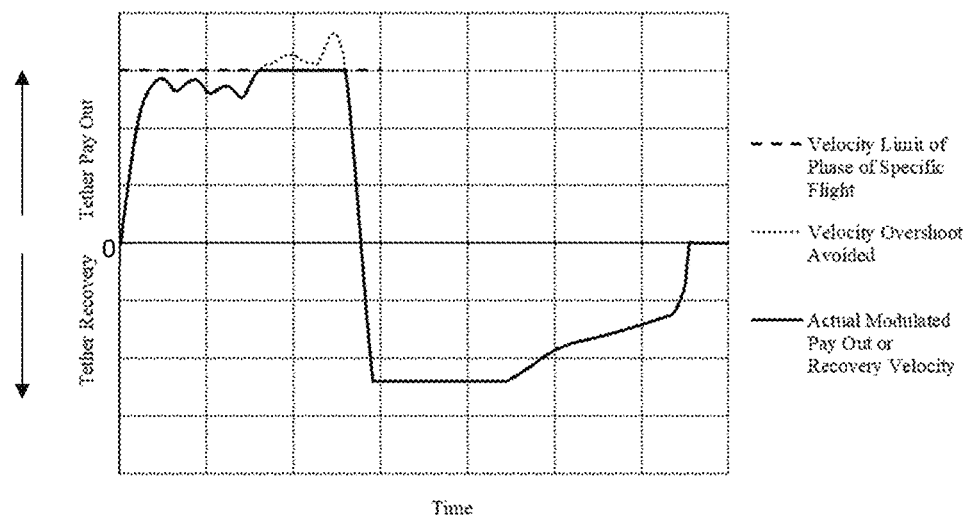
FIG. 13 illustrates the effect on the behavior of the payout velocity of a system with the reduced hydraulic circuit resistance in FIG. 9 and employing the absorbing dynamometer during the generation phase to modulate the torque transmitted to the rotational to power the first hydraulic pumps, when operating with the same flight profile of FIG. 10.

FIG. 13 illustrates the effect on the behavior of the payout velocity $\dot{x}_T$ of a system with the reduced hydraulic circuit resistance in FIG. 9 and employing the absorbing dynamometer during the generation phase to modulate the torque transmitted to the rotational to hydraulic power first hydraulic pumps, when operating with the same flight profile of FIG. 10. This demonstrates that employing the absorbent dynamometer has much more value than a device for managing exceptional circumstances. The velocity increases overall because of the reduced reaction force from the ground station power system. This is due to the reduced fluid resistance, and although the system is more efficient and can harness more energy as a result, at certain points during the cycle there is not enough reaction force to prevent the tether payout from overshooting its optimum velocity. This overspeed would initiate a chain of events starting with a loss of tension in the tether, the craft then losing lift and so further reducing tension. Energy harnessing would cease while the craft recovered. The line representing avoided overshoot would therefore not actually occur, but it does indicate how much power has to be dissipated by the absorbent dynamometer in order to maintain the payout velocity at its optimum. A greater length of tether is paying out as a result of the increased instantaneous velocities, and so the recovery phase takes longer.

The net energy harnessed in FIG. 13 is some twenty percent higher than the net energy harvested in FIG. 11 because the energy dissipated by the absorbent dynamometer to avoid overspeed is lower than the energy lost to the inefficiency of a load resistance balanced to the craft as a power source and the characteristics of the energy storage (analogous to a capacitance).

During the retrieval phases of both FIGS. 11 and 13, the pump displacement is reduced to about twenty five percent of the total, with further reductions during parts of the retrieval phase when tether tension was at its lowest.

Optimization and operational control of the torque load from the absorbent dynamometer and adjustments to pump displacement are achieved through cooperation with the flight control system.

Figure 14:
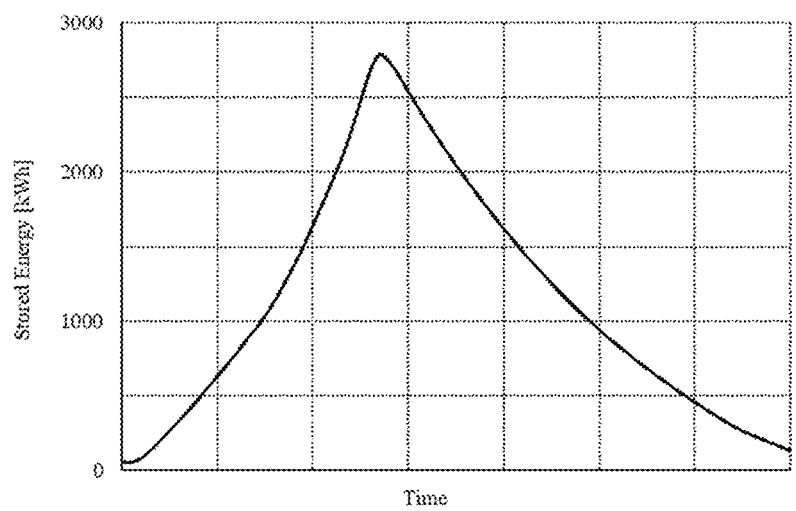
FIG. 14 illustrates the state of charge of the hydraulic accumulators in terms of the energy stored for the velocity profile of FIG. 13.
Figure 18:
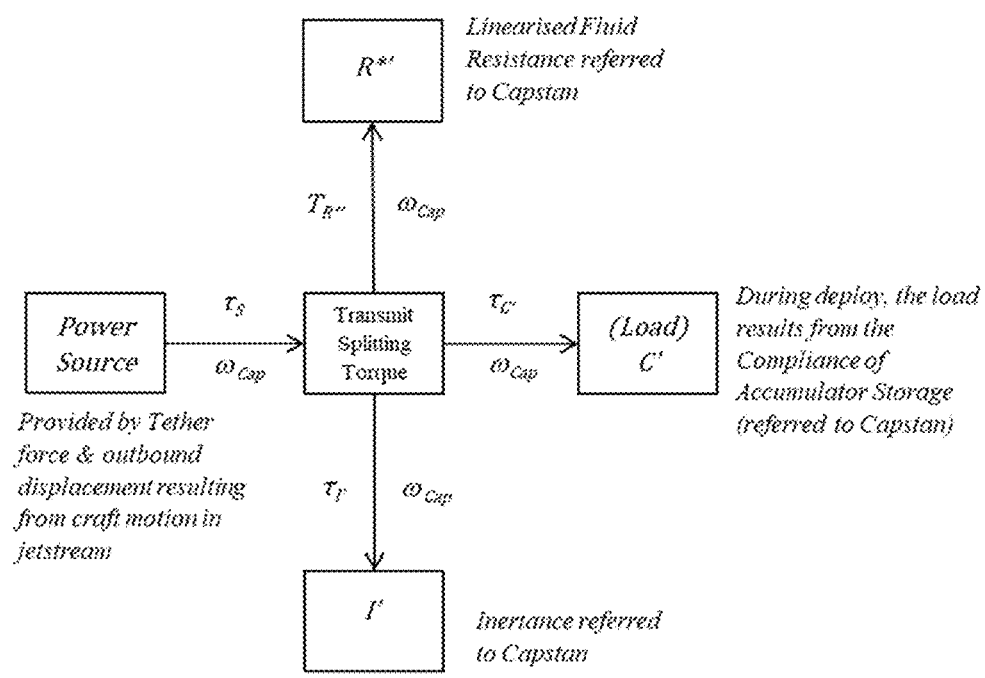
FIG. 18 illustrates a lumped model of the power as seen at the capstan/sun gear shaft.
Figure 19:
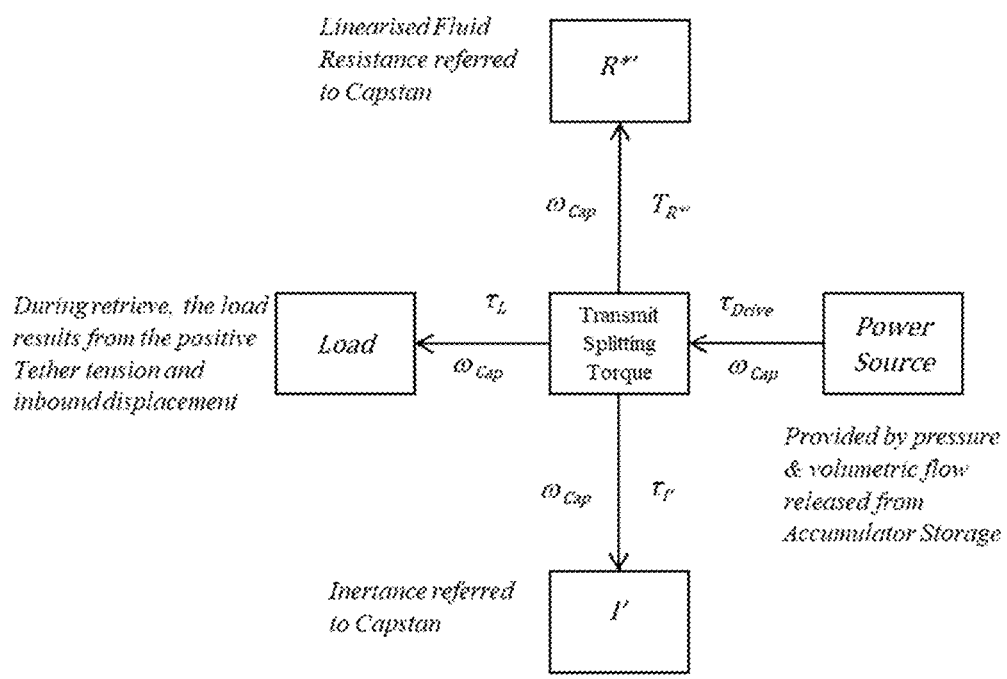
FIG. 19 illustrates the linearization of the fluid resistance over a range in which the system operates for 99% of the operating cycle.
Figure 20:
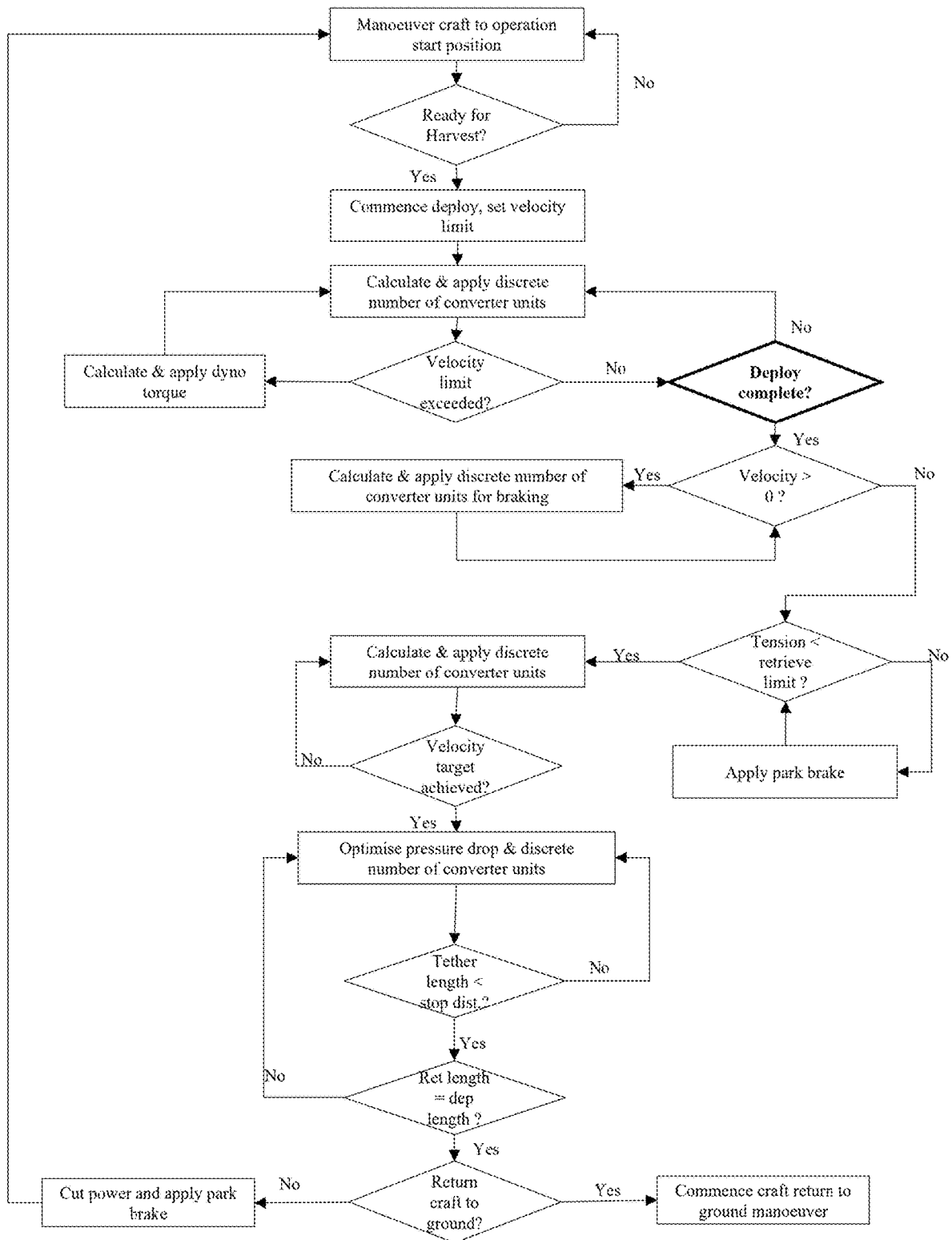
FIG. 20 illustrates a flow chart depicting the primary logic sequence of decisions and actions for control decisions and modulation.

FIG. 14 illustrates the state of charge of the hydraulic accumulators in terms of the energy stored for the velocity profile of FIG. 13. A greater portion of the available storage capacity is required because of the overall increase in harnessed energy.

FIGS. 15A and 15B illustrate the kite tracker in two orientations relative to two different wind directions. The angle subtended by the track can range from 60° to 360°. The kite tracker is required to guide the tether 01 off and on to the capstan drum 03 in such a way that the tether is maintained both perpendicular to the axis of rotation of the drum and tangential to the circumference of the drum, whatever the direction and angle of the tether with respect to the ground. A suitable arrangement of sheaves is required to achieve this, as well as anchoring those sheaves to the ground and eliminating undesirable displacements vertically and horizontally. A circular track 04 guides and restrains the kite tracker 02.

FIG. 16 illustrates a cross-section of an embodiment of the circular track or tracks that restrain the kite tracker. In one embodiment, the kite tracker includes a frame that is configured to hold a first arm and a second arm. The first arm is configured to be connected to the capstan drum. The second arm is configured to extend from the frame at a first predetermined angle. The second arm is configured to securely receive the tether thereon to facilitate handling of the tether.

In an embodiment, the second arm is configured to extend from the frame at a first predetermined angle ranging between 30° and 80°.

In an embodiment, the frame includes a leg 26 and a pair of wheels 24, 25 attached on an operative bottom portion of the leg 26 by means of at least one axle 31, 33 for displacing the kite tracker 02 on the guide track 04. In another embodiment, the frame includes a pair of axles 31, 33.

In order to restrain the kite tracker and at the same time allow it to swivel to any angle with respect to the capstan drum, at least one circular track is employed. Two perpendicular axles 31, 33 affixed to lateral strut 32, with wheels 24, 25 that freely rotate are attached to the restraining leg 26 of the kite tracker 02, and these wheels support the forces acting vertically and radially with respect to the inside of the track 04.

FIGS. 17A and 17B illustrate two possible embodiments of the tether storage means utilizing a carousel-type arrangement and a drum-type arrangement. A considerable length of large diameter tether 34 can be accommodated on the low-tension side of the capstan drum by employing a range of alternative storage arrangements. For example, FIG. 15A illustrates a carousel-type of arrangement whereby the low-tension tether is coiled into layers between the carousel's central core 35 and its perimeter limit 36 during the recovery phase ready for smooth twist free uncoiling when the tether is paying out during the generation phase of the cycle. The carousel 28 is rotatable in both clockwise and counter-clockwise directions, and the tether guide 27 is displaceable in a radial direction with respect to the carousel. In an alternative embodiment, a drum-type of arrangement illustrated in FIG. 15B could be employed. The drum 30 is rotatable in both clockwise and counter-clockwise directions, and the tether guide 29 is displaceable in an axial direction with respect to the drum. Twenty to thirty kilometers of a tether that is one hundred millimeters in diameter could be easily stored on a drum of six meters diameter and twenty meters length.

Table 2 illustrates some of the important design parameters and values that can be assigned to them to produce the performance exemplified in FIGS. 1, 11, 12, 13 and 14. A capstan of radius 2.5 m is appropriate for the rope thickness required of the tether. A two-stage gear-train with an overall gear ratio of 7.5 is configured to match the pressure and volumetric flow of 15 first hydraulic pumps 07 to the amount of energy storage required if each pump has a displacement of 0.0028 m3 (0.74 gallons) per radian or 0.0176 m3 (4.64 gallons) per revolution.

TABLE 2

| Sub-System | Conversion Reference | Input Variables | Output Variables | Conversion Coefficient of Multiplication | Typical Value |
|---|---|---|---|---|---|
| Capstan | $K_f$ | Force | Torque | Radius | 2.5 [m] |
| | | Velocity | Angular Velocity | 1/Radius | 0.4 [m$^{-1}$] |
| Gearbox | $K_V$ | Torque | Torque | 1/Ratio | 0.133 |
| | | Angular Velocity | Angular Velocity | Ratio | 7.5 |
| Planetary Torque Splitting | 1/n | Torque | Torque | 1/Number of Converters | 0.083 |
| Pump Converter | $K_{VM}$ | Torque | Pressure | 1/Displacement | 360 [radian/m$^3$] |
| | | Angular Velocity | Volumetric Flow | Displacement | 0.0028 [m$^3$/radian] |
| Parallel Flow Summing | n | Volumetric Flow | Volumetric Flow | Number of Converters | 15 |

The power transmission between capstan and energy storage also invokes changing energy form. We tend to call this conversion, although technically changing energy form is a transduction or transformation. Being precise, power conversion also covers the torque reduction/speed increase of gears, or voltage reduction/current increase of transformers, for example.

In this example, there are a maximum of 15 individual and separate first hydraulic pump planets per sun gear, because of the gear ratio limitation. It is feasible, although more complex, requiring more vertical space and maybe maintenance problems, to have more than one sun gear per capstan shaft. The number of discrete steps at the level of first hydraulic pump control is the number of first hydraulic pump planets. Discrete control at the first hydraulic pump level can be by means of engage-disengage from power source or open-close the circuit to the energy storage load.

In an embodiment, the first hydraulic pumps are configured to act as pumps and motors. In the case of piston pumps/motors, each has multiple individual and separate pistons that can be discretely controlled cycle to cycle, and in principle even within a cycle, if the valves can move quickly enough (that in itself takes energy, and we are talking about large devices). The discrete steps of control can thus be at piston level, and possibly smaller—almost continuously variable.

It must be kept in mind that the system between the capstan and the energy storage is a transmission system that converts power between rotational and hydraulic energy forms. As such, the discrete steps represent gear ratio changes. Changing gear to reduce input speed increases input torque, and vice versa. The opposite happens on the output side, whichever direction you are driving (deploy or retrieve). It's just that for the hydraulic embodiment, one side is torque and speed, the other is pressure and volumetric flow. The units of the conversion are m3/radian (57° of rotation), which is the total pump/motor displacement engaged (in discrete steps).

Technical Advancements

The present disclosure described herein has several technical advantages, including, but not limited to, the realization of a jetstream power generating system that:

makes electric power generation from seasonal jetstream force a quantified, practical, and manufactured advent;
facilitates continuous electric power supply at constant rate;
is capable of dynamically matching its impedance with the generated power;
is capable of harmonizing a very dynamic power curve from a nominal power curve;
is capable of cooperating with the ground base station and vice versa to harness maximum amount of the available energy, as is useful, prudent and profitable;
generates power safely, consistently and reliably;
facilitates storage of energy;
avoids electric power fluctuation;
maintains a desired range of positive tether tension;
minimizes the wear and tear of the tether;
facilitates retrieval of the tether without need for an external power supply;
facilitates stationary holding of the tethered craft for a desired time without generating power;
facilitates transmission of energy from the tether to the winch or capstan arrangement efficiently;
facilitates guiding of the tether at any desired range of angle between a ground-based station and a craft;
facilitates tether alignment with the wind and jetstream azimuth;
minimizes twisting and ensuring bend-straighten of the tether;
avoids premature fatigue and maintains the undeployed length of the tether stress free;
is economical and environmentally friendly;
is easy to manufacture, transport, site, assemble, operate, maintain and repair;
integrates proven, existing manufactured components, with calibrated and verified performance metrics;
maximizes the use of abundant materials, and minimizes demand for scarce mined materials and natural resources;
offers recyclability of the components;
fulfills requirements for limited airspace access and land use, useful and valuable as infrastructure;
can be deployed in infrastructural farms of power generating system units in coordination;
generates electric power with high energy density and capacity, relative to surface area; and
makes valuable use of relatively limited-access airspace to generate power.

To that end, the present disclosure anticipates thousands of generating units installed in dozens of energy farm areas of dual-use land. Fortunately, jetstreams are Earth's largest natural solar energy collector, a decentralized and untapped natural resource that exists at petroleum scale. Each jetstream energy farm, as presently anticipated, nominally yielding 100 terawatts (TW) hours per year, from a ground footprint of 1,000 square kilometers (km2). Importantly, for infrastructure planning, with a surface area energy density per square meter at least 10 times (an order of magnitude) greater than that of horizontal-axis wind turbines.

The system makes practical and possible to quantify inputs, outputs, costs and risks; including power generating system capacity, production and surface area energy density, as compared to other power generation choices.

The embodiments herein and the various features and advantageous details thereof are explained with reference to the non-limiting embodiments in the following description. Descriptions of well-known components and processing techniques are omitted, to not unnecessarily obscure the embodiments herein. The examples used herein are intended merely to facilitate an understanding of ways in which the embodiments herein may be practiced, and to further enable those of skill in the art to practice the embodiments herein. Accordingly, the examples should not be construed as limiting the scope of the embodiments herein.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A jetstream power generating system comprising:
    an airborne element configured to be subjected to lift forces while flying in a jetstream;
    a capstan drum;
    a tether coupled between said airborne element and said capstan drum;
    an arcuate guide track associated with said capstan drum;
    a kite tracker displaceably mounted on said guide track, said kite tracker configured to securely guide said tether to rotate said capstan drum in a first direction with a force equivalent to the lift force to facilitate payout of said tether, and to rotate said capstan drum in a second direction when said tether is reeled in;
    a conversion unit configured be coupled to said capstan drum, said conversion unit configured to be driven by said capstan drum, when said capstan drum is rotated in said first direction, to pressurize hydraulic fluid passing there through, said conversion unit including:
        a shaft extending from said capstan drum,
        planetary gear-train defined by a sun gear configured to be mounted on said shaft to be driven by said capstan drum, and a plurality of planet gears configured to mesh with said sun gear,
        a plurality of first hydraulic pumps, each first hydraulic pump configured to engage with each planet gear, and configured to be driven by said planet gear to facilitate pressurization of the hydraulic fluid passing there through, and
        a dynamometer connected to said shaft, said dynamometer being configured to be driven by said capstan drum to dissipate energy therein;
    a plurality of accumulators configured to fluidly communicate with said conversion unit, each accumulator configured to receive and store said pressurized hydraulic fluid therein; and
    a generator configured to receive said pressurized hydraulic fluid to facilitate generation of electric power.

2. The system as claimed in claim 1, wherein said first hydraulic pumps are piston pumps.

3. The system as claimed in claim 2, wherein each piston pump includes a solenoid valve, said solenoid valve being configured to selectively activate or deactivate each piston chamber of said piston pumps.

4. The system as claimed in claim 1, wherein said first hydraulic pumps also function as motors.

5. The system as claimed in claim 1, which includes a second hydraulic pump configured to function as a motor, to fluidly communicate with the accumulators to receive the stored pressurized fluid therefrom to rotate said generator.

6. The system as claimed in claim 1, wherein said first hydraulic pumps are configured to be driven in a reverse direction to facilitate the reversal in the direction of motion of said gear-train, to further facilitate rotation of said capstan drum in said second direction.

7. The system as claimed in claim 1, wherein said accumulators are configured to direct the pressurized hydraulic fluid to said first hydraulic pumps to drive said first hydraulic pumps in said reverse direction.

8. The system as claimed in claim 1, which includes a control unit configured to communicate with said first hydraulic pumps, said control unit configured to sync the actuation of said first hydraulic pumps to enable rotation of said capstan drum in said second direction.

9. The system as claimed in claim 8, wherein said control unit is configured to communicate with a remote device to receive inputs corresponding to payout and reeling in of said tether from said remote device.

10. The system as claimed in claim 9, wherein said control unit is configured to communicate and control
    (a) the activation of selective first hydraulic pump cylinders,
    (b) said dynamometer,
    (c) the fluid communication between first hydraulic pumps and accumulators, and
    (d) the remote device to accomplish loiter of the remote device.

11. The system as claimed in claim 1, wherein said airborne element is a pumping kite or a tethered gyro glider.

12. The system as claimed in claim 1, wherein said kite tracker includes a frame that is configured to hold a first arm configured to be connected to said capstan drum, and a second arm configured to extend from said frame at a first predetermined angle, said second arm configured to securely receive said tether thereon to facilitate handling of the tether.

13. The system as claimed in claim 12, wherein said frame includes a leg and a pair of wheels attached on an operative bottom portion of said leg by means of at least one axle for displacing said kite tracker on said guide track.

14. The system as claimed in claim 1, wherein an operative central axis of said sun gear is configured to be coincidental to an operative central axis of said capstan drum.

15. The system as claimed in claim 1, wherein said dynamometer is an absorbent dynamometer selected from a group consisting of eddy current dynamometer, magnetic powder dynamometer, hysteresis dynamometer, electric generator dynamometer, fan dynamometer, hydraulic dynamometer, force lubricated oil shear dynamometer and water dynamometer.

16. The system as claimed in claim 1, wherein said generator is a synchronous generator.

17. The system as claimed in claim 1, wherein the said accumulators are determined, sized and configured to store enough energy to recover the entire length of the tether without placing any demand on external sources.

* * * * *